United States Patent
Shapiro Ilan et al.

(10) Patent No.: US 11,576,384 B2
(45) Date of Patent: Feb. 14, 2023

(54) COMPOSITIONS AND METHODS TO REDUCE INSECT PESTS

(71) Applicants: The United States of America, as represented by the Secretary of Agriculture, Washington, DC (US); UNIVERSITY OF GEORGIA RESEARCH FOUNDATION, Athens, GA (US)

(72) Inventors: David I. Shapiro Ilan, Macon, GA (US); Robert W. Behle, Morton, IL (US); Shaohui Wu, Centerville, GA (US); Michael Toews, Tifton, GA (US); Louela Castrillo, Ithaca, NY (US)

(73) Assignees: The United States of America, as represented by The Secretary of Agriculture, Washington, DC (US); UNIVERSITY OF GEORGIA RESEARCH FOUNDATION, INC., Athens, GA (US)

( * ) Notice: Subject to any disclaimer, the term of this patent is extended or adjusted under 35 U.S.C. 154(b) by 289 days.

(21) Appl. No.: 16/850,516

(22) Filed: Apr. 16, 2020

(65) Prior Publication Data

US 2021/0321624 A1     Oct. 21, 2021

(51) Int. Cl.
*A01N 63/30*     (2020.01)
*A01N 25/02*     (2006.01)
*A01P 7/04*     (2006.01)

(52) U.S. Cl.
CPC .............. *A01N 63/30* (2020.01); *A01N 25/02* (2013.01); *A01P 7/04* (2021.08)

(58) Field of Classification Search
CPC ............ A01N 63/30; A01N 25/02; A01P 7/04
See application file for complete search history.

(56) References Cited

U.S. PATENT DOCUMENTS

| | | | |
|---|---|---|---|
| 7,241,612 B2* | 7/2007 | Shapiro-Ilan | C12N 1/14 424/93.5 |
| 2011/0110895 A1* | 5/2011 | Prenerova | C12N 1/145 424/93.5 |
| 2015/0126365 A1* | 5/2015 | Sword | A01N 63/30 504/117 |

OTHER PUBLICATIONS

Thomas C. Sparks, Frank J. Wessels, Beth A. Lorsbach, Benjamin M. Nugent and Gerald B. Watson, "The new age of insecticide discovery—the crop protection industry and the impact of natural products", Pesticide Biochemistry and Physiology 161 (2019) 12-22. (Year: 2019).*
Shaohui Wu, Michael D. Toews, Camila Oliveira-Hofman, Robert W. Behle, Alvin M. Simmons and David I. Shapiro-Ilan, "Environmental Tolerance of Entomopathogenic Fungi: A New Strain of Cordyceps javanica Isolated from a Whitefly Epizootic Versus Commercial Fungal Strains", Insects, 2020, 11(10), 711. (Year: 2020).*
Avery P.B., et al., 2016, "Efficacy of topical application, leaf residue or soil drench of blastospores of Isaria fumosorosea for citrus root weevil management: laboratory and greenhouse investigations," Insects 7: 66.
Bavers J.B., et al., 1972, "Two muscardine fungi pathogenic to Diaprepes abbreviates," Fla. Entomol. 55:117-120.
Cabanillas H.E. and Jones W.A., 2009, "Effects of temperature and culture media on vegetative growth of an entomopathogenic fungus *Isaria* sp. (Hypocreales: Clavicipitaceae) naturally affecting the whitefly, *Bemisia tabaci* in Texas," Mycopathologia 167: 263-271.
Carbone I. and Kohn L.M., 1999, "A method for designing primer sets for speciation studies in filamentous ascomycetes," Mycologia 91: 553 556.
Cuellar-Sandoval J.F., 2019, "Agroecological basis for the design of biotechnological traps based on Isaria fumosorosea for the biological control of Bemisia tabaci in strawberry crops," Biocontrol Sci. Technol. 29(1): 1-18.
Jaronski S.T., 2010, "Ecological factors in the inundative use of fungal entomopathogens," BioControl 55: 159-185.
Kang B.R., et al., 2018, "Dual Biocontrol Potential of the Entomopathogenic Fungus, *Isaria javanica*, for Both Aphids and Plant Fungal Pathogens," Mycobiology 46(4): 440-447.
Mascarin, G.M., et al., 2013, "The virulence of entomopathogenic fungi against Bemisia tabaci biotype B (Hemiptera: Aleyrodidae) and their conidial production using solid substrate fermentation," BioControl 66: 209-218.
Shapiro-Llan D. et al. (2008, "Virulence of Hypocreales fungi to pecan aphids (Hemiptera: Aphididae) in the laboratory," J. Invertebr. Pathol. 99: 312-317.
Shapiro-Llan D.I., et al., 2015, "Viability and virulence of entomopathogenic nematodes exposed to ultraviolet radiation," J Nematol. 47: 184 189.
Souza R.K.F., et al., 2014, "Conidial water affinity is an important characteristic for thermotolerance in entomopathogenic fungi," Biocontrol Sci. Technol. 24:448-461.

* cited by examiner

*Primary Examiner* — Mina Haghighatian
*Assistant Examiner* — Nathan W Schlientz
(74) *Attorney, Agent, or Firm* — John D. Fado; Maria Restrepo-Hartwig

(57) ABSTRACT

The invention relates to biocontrol compositions comprising an entomopathogenic fungus, kits comprising such an entomopathogenic fungus, and methods of using such a fungus and compositions to reduce or kill the population of agricultural, vegetable, or horticultural crop insect pests.

19 Claims, 23 Drawing Sheets

Specification includes a Sequence Listing.

SEQUENCE LISTING

<160> NUMBER OF SEQ ID NOS: 6

<210> SEQ ID NO 1
<211> LENGTH: 22
<212> TYPE: DNA

```
<213> ORGANISM: Artificial Sequence
<220> FEATURE:
<223> OTHER INFORMATION: Primer ITS1F

<400> SEQUENCE: 1
cttggtcatt tagaggaagt aa                                              22

<210> SEQ ID NO 2
<211> LENGTH: 20
<212> TYPE: DNA
<213> ORGANISM: Artificial Sequence
<220> FEATURE:
<223> OTHER INFORMATION: Primer ITS5

<400> SEQUENCE: 2
tcctccgctt attgatatgc                                                 20

<210> SEQ ID NO 3
<211> LENGTH: 23
<212> TYPE: DNA
<213> ORGANISM: Artificial Sequence
<220> FEATURE:
<223> OTHER INFORMATION: Primer 983F

<400> SEQUENCE: 3
gctcctggac atcgtgactt cat                                             23

<210> SEQ ID NO 4
<211> LENGTH: 23
<212> TYPE: DNA
<213> ORGANISM: Artificial Sequence
<220> FEATURE:
<223> OTHER INFORMATION: Primer 2218R

<400> SEQUENCE: 4
atgacaccga cagcgacggt ctg                                             23

<210> SEQ ID NO 5
<211> LENGTH: 567
<212> TYPE: DNA
<213> ORGANISM: Isaria javanica

<400> SEQUENCE: 5
gtgacagcgg agggatcatt aacgagtttt tcaactccc taacccttg tgaacatacc       60
tatcgttgct tcggcggact cgccccggcg tccggacggc cctgcgccgc ccgcgacccg    120
gacccaggcg gccgccggag acccacaaat tctgtttcta tcagtctttc tgaatccgcc    180
gcaaggcaaa acaaatgaat caaaactttc aacaacggat ctcttggttc tggcatcgat    240
gaagaacgca gcgaaatgcg ataagtaatg tgaattgcag aattcagtga atcatcgaat    300
ctttgaacgc acattgcgcc cgccagcatt ctggcgggca tgcctgttcg agcgtcattt    360
caaccctcga cacccttcg ggggagtcgg cgttggggac cggcagcata ccgccggccc    420
cgaaatacag tggcggcccg tccgcggcga ccctctgcgta gtactccaac gcgcaccggg    480
aacccgacgc ggccacgccg taaaacaccc aacttctgaa cgttgacctc ggatcaggta    540
ggactacccg ctgaacttaa gcatatc                                        567

<210> SEQ ID NO 6
<211> LENGTH: 921
<212> TYPE: DNA
<213> ORGANISM: Isaria javanica

<400> SEQUENCE: 6
```

```
attctcatca tcgctgccgg tactggtgag ttcgaggctg gtatctccaa ggatggccag    60
acccgtgagc acgctctgct cgccttcacc ctcggtgtca agcagctcat cgttgccatc   120
aacaagatgg acactgctca gtgggccgag gctcgttacc aggaaatcat caaggagact   180
tccaacttca tcaagaaggt cggctacaac cccaagactg ttgccttcgt ccccatctct   240
ggtttcaacg gcgacaacat gctggccccc tccaccaact gccctggta caagggttgg   300 gagaaggaga ccaaggccgg caagtccacc ggcaagaccc tcctcgaggc tattgacgcc   360
atcgagcccc ccaagcgtcc cctcgacaag cccctccgtc ttcctcttca ggatgtctac   420
aagatcggtg gtatcggaac ggtgcccgtc ggtcgtgtcg agactggtat catcaagccc   480
ggcatggtcg tcacctttgc tccttccaac gtcaccactg aagtcaagtc cgtcgagatg   540
caccacgagc agctgcccga gggtgttccc ggtgacaacg tcggcttcaa cgtgaagaac   600
gtttccgtca aggaaatccg tcgtggtaac gtcgctggtg actccaagaa cgaccctccc   660
aacggtgctg cctccttcaa cgcccaggtc attgtcatca accaccctgg ccagatcggt   720
aacggttacg cccctgttct tgactgccac actgcccaca ttgcttgcaa gttctccgag   780
ctcctcgaga agatcgaccg ccgtactggt aagtcggttg agaacaaccc caagttcatc   840
aagtctggtg actccgccat cgtcaagatg gttccctcca agcccatgtg cgttgaggct   900
ttcaccgact accccctct g                                              921
```

COMPOSITIONS AND METHODS TO REDUCE INSECT PESTS

FIELD OF THE INVENTION

The invention relates entomopathogenic fungi, and to biocontrol compositions comprising entomopathogenic fungi, kits comprising such entomopathogenic fungi, and methods of using such fungi and compositions to reduce or kill the population of agricultural, vegetable, or horticultural crop insect pests.

SEQUENCE LISTING

The instant application contains a Sequence Listing which has been submitted via EFS-Web as ASCII compliant text file format (.txt), and is hereby incorporated by reference in its entirety. The ASCII file was created on Apr. 14, 2020, is named SequenceListing, and has 11 kilobytes. This Sequence Listing serves as paper copy of the Sequence Listing required by 37 C.F.R. § 1.821(c) and the Sequence Listing in computer-readable form (CRF) required by 37 C.F.R. § 1.821(e). A statement under 37 C.F.R. § 1.821(f) is not necessary.

BACKGROUND OF THE INVENTION

The whitefly. *Bemisia tabaci* (Gennadius) (Hemiptera: Aleyrodidae), is globally recognized as a serious pest of ornamentals, vegetables, and field crops. Whiteflies feed directly on the phloem, resulting in reduced growth and plant vigor, viral plant disease transmission, and secondary effects including growth of sooty molds in the honeydew accumulation. *Bemisia tabaci* is comprised of a complex of biotypes. In the state of Georgia, USA, the biotype B, referred to as the silverleaf whitefly (or sweet potato whitefly), is a dominant type. It has multiple generations per year, and infests various horticultural and agricultural crops. The pest overwinters on cole crops, moves to cucurbits and collards in spring and early summer, infests cotton and soybean in summer, and then moves to vegetable crops in the fall.

Entomopathogenic fungi (EPF) are known to naturally infect insects, and some of them have been commercially produced as biocontrol agents for pest management. EPF penetrate the insect integument, proliferate in the insect body and attack host tissues, followed by emergence from the insect host and the production of conidia or spores that could infect other insects. When environmental conditions are suitable, this horizontal transmission can lead to epizootics that could significantly impact insect pest populations. More than 20 EPF species have been reported to infect whiteflies. A commercialized EPF species, *Metarhizium brunneum* Petch (formerly *M. anisopliae* [Metchnikoff] Sorokin), has been relatively less studied for whitefly management.

Compared to other control agents, especially synthetic insecticides, EPF possess several advantages including reduced risk of resistance development, potential for long-term persistence in the environment, and greater safety to humans and other non-target vertebrate or invertebrate organisms. However, the level of insect pest control may vary with fungal species and/or strains, environmental conditions and target insects.

The efficacy of EPF in the field may be affected by various ecological factors, including among others, solar radiation (primarily shortwave ultraviolet), rain, temperature, humidity, surface chemistry, and phylloplane microbiota. Among those factors, EPF tolerance of temperature extremes is considered particularly important as it affects fungal persistence and efficacy, as well as shelf-life during storage and transportation. Additionally, tolerance to solar radiation is critical for field success as it affects survival of conidia following application. For example, conidial viability of *Beauveria bassiana* strain GHA decreases more slowly on the leaf undersides (9-11% per day) compared to the upper leaf surface without shade (47% per day). Thus, these environmental factors are important considerations when evaluating the commercial potential of EPF strains and species.

Thus, new Entomopathogenic fungi tolerant to environmental factors, such as temperature extremes and solar radiation, are needed for the biocontrol of agricultural, vegetable or horticultural crop insect pests.

SUMMARY OF THE INVENTION

Provided herein is an entomopathogenic fungus, biocontrol compositions comprising such entomopathogenic fungus, kits comprising such entomopathogenic fungus, and methods of using such fungus and biocontrol compositions to reduce the population of vegetable or horticultural crop insect pests, or kill such insect pests.

In an embodiment, the invention relates to a biocontrol composition comprising an agriculturally acceptable carrier and an effective amount of an entomopathogenic fungal strain that kills vegetable, horticultural, or agricultural crop insect pests. In some embodiments of the invention, the entomopathogenic fungal strain in the biocontrol composition kills homopteran and curculionid pests or other insects in the orders such as Diptera, Coleoptera, Thysanoptera, Lepidoptera, Hemiptera, mites, Orthoptera, or Hymenoptera. In some embodiments of the invention, the biocontrol composition is a liquid, a powder, a granule, a suspension concentrate, a flowable, a dry flowable, a dust, or a water dispersible granule. In some embodiments of the invention, the agriculturally acceptable carrier in the biocontrol composition is at least one polymer, oil, wax, emulsifier, surfactant, binder, clay, filler, water, agar, gelatin, a lipophilic substance, a plant seed, or a substance that assists application of the fungi, or adhesion of the fungi a plant, or a plant part thereof. In some embodiments of the invention, the emulsifiable concentrate or granule in the biocontrol composition is diluted with water or oil. In some embodiments of the invention, the plant seed in the biocontrol composition is an agricultural crop seed, a vegetable seed, or a horticultural crop seed. In some embodiments of the invention, the plant seed in the biocontrol composition is a cole crop seed, a cucurbit seed, a cotton seed, a soybean seed, or a vegetable crop seed. In some embodiments of the invention, the entomopathogenic fungal strain in the biocontrol composition is a *Isaria javanica* strain named Ij wf GA17, having NRRL accession No. 67939

In an embodiment, the invention relates to a kit comprising a first container comprising an entomopathogenic fungus that kills agricultural, vegetable, or horticultural crop insect pests, and instructions for applying the entomopathogenic fungus to land, a plant, or part thereof, and optionally comprising a second container. In some embodiments of the invention, the entomopathogenic fungus in the kit is Ij wf GA17 having NRRL accession No. 67939. In some embodiments of the invention, the first container in the kit comprises spores or vegetative mycelium of the entomopathogenic fungus. In some embodiments of the invention, the optional second container in the kit comprises an agriculturally acceptable carrier. In some embodiments of the invention, the agriculturally acceptable carrier in the kit is a polymer, a vegetable oil, a vegetable wax, a paraffinic oil, a paraffinic wax, an emulsion of oil and water, an aqueous solution containing a polymer, agar, gelatin, or a lipophilic substance that assists the fungi in adhering to a plant or part thereof.

In an embodiment, the invention relates to a method for reducing the population of agricultural, vegetable, or horticultural crop insect pests in an area of land comprising applying to the land or to at least one part of a crop plant on the land an effective amount of a biocontrol composition comprising an agriculturally acceptable carrier and an effective amount of an entomopathogenic fungal strain that kills vegetable, horticultural, or crop insect pests to reduce the population of agricultural, vegetable, or horticultural crop insect pests. In some embodiments of the invention, the applying step in the method for reducing the population of agricultural, vegetable, or horticultural crop insect pests comprises broadcasting onto the land or to at least one part of a crop plant on the land, or planting crop seeds coated with spores of the fungal strain. In some embodiments of the invention, the applying step in the method for reducing the population of agricultural, vegetable, or horticultural crop insect pests comprises broadcasting onto the land or to at least one part of a crop plant on the land vegetative mycelium of the fungal strain, or planting crop seeds coated with vegetative mycelium of the fungal strain. In some embodiments of the invention, the applying step in the method for reducing the population of agricultural, vegetable, or horticultural crop insect pests comprises spraying the biocontrol composition onto crop plants, or at least a part of a crop plant present on the land. In some embodiments of the invention, the part of the crop plant where the biocomposition is spread is a leaf, a seed, a fruit, a stem, a branch, a root, or a combination thereof.

In an embodiment, the invention relates to a method of killing agricultural, vegetable, or horticultural crop insect pests in a crop field, comprising applying a biocontrol composition comprising an agriculturally acceptable carrier and an effective amount of an entomopathogenic fungal strain that kills vegetable, horticultural, or crop insect pests in an amount effective to colonize crop plants in the crop field and kill the agricultural, vegetable, or horticultural crop insect pests. In some embodiments of the invention, applying the biocontrol composition in the method for killing agricultural, vegetable, or horticultural crop insect pests in a crop field comprises broadcasting, or planting crop seeds coated with vegetative mycelium of the entomopathogenic fungal strain onto the crop field, or spraying onto the crop plants or parts thereof a liquid containing vegetative mycelium of the entomopathogenic fungal strain. In some embodiments of the invention, applying the biocontrol composition in the method for killing agricultural, vegetable, or horticultural crop insect pests in a crop field comprises spraying onto at least one crop plant or at least one part thereof a liquid containing spores of the entomopathogenic fungal strain.

BRIEF DESCRIPTION OF THE DRAWINGS

FIG. 1A shows the mortality at 3 dpi. FIG. 1B shows the mortality at 5 dpi. FIG. 1C shows the mortality at 7 dpi. The Y axis presents the percent mortality (%); the X axis presents the different treatments UTC=Untreated Control; Ij wf GA17=*Isaria javanica* strain wf GA17; If Apopka97=*Isaria fumosorosea* strain Apopka 97; Bb GHA=*Beauveria bassiana* strain GHA; Mb F52=*Metarhizium brunneum* strain F52. Means with the same capital letters indicate no significant difference among treatments within time period, whereas means with the same lower-case letters indicate no differences within that treatment among time periods (Tukey's test, $\alpha$=0.05).

FIG. 2A shows the results for 3 dpi. FIG. 2B shows the results for 5 dpi. FIG. 2C shows the results for 7 dpi. The Y axis presents the percentage mycosis (%); the X axis presents the different fungal treatments UTC=Untreated Control; Ij wf GA17=*Isaria javanica* strain wf GA17; If Apopka 97=*Isaria fumosorosea* strain Apopka 97; Bb GHA=*Beauveria bassiana* strain GHA; Mb F52=*Metarhizium brunneum* strain F52. Means with the same capital letters indicate no significant difference among treatments within time period, whereas means with the same lower-case letters indicate no differences within that treatment among time periods (Tukey's test, $\alpha$=0.05).

FIG. 3A shows the results for 3 dpi of $4^{th}$ instar *A. gossypii* without wingbuds. FIG. 3B shows the results for 3 dpi of $4^{th}$ instar *A. gossypii* with wingbuds. FIG. 3C shows the results for 5 dpi of $4^{th}$ instar *A. gossypii* without wingbuds. FIG. 3D shows the results for 5 dpi of $4^{th}$ instar *A. gossypii* with wingbuds. FIG. 3E shows the results for 7 dpi of $4^{th}$ instar *A. gossypii* without wingbuds. FIG. 3F shows the results for 7 dpi of $4^{th}$ instar *A. gossypii* with wingbuds. The Y axis presents the percentage mortality (%); the X axis presents the different treatments UTC=Untreated Control; Ij wf GA17=*Isaria javanica* strain wf GA17; If Apopka97=*Isaria fumosorosea* strain Apopka 97; Bb GHA=*Beauveria bassiana* strain GHA; Mb F52=*Metarhizium brunneum* strain F52. Means with the same capital letters indicate no significant difference among treatments within time period, whereas means with the same lower-case letters indicate no differences within that treatment among time periods (Tukey's test, $\alpha$=0.05). * indicates significant difference between aphid type paralleled at a given treatment and dpi (P≤0.05).

FIG. 4A shows the results for 3 dpi of $4^{th}$ instar *A. gossypii* without wingbuds. FIG. 4B shows the results for 3 dpi of $4^{th}$ instar *A. gossypii* with wingbuds. FIG. 4C shows the results for 5 dpi of $4^{th}$ instar *A. gossypii* without wingbuds. FIG. 4D shows the results for 5 dpi of $4^{th}$ instar *A. gossypii* with wingbuds. FIG. 4E shows the results for 7 dpi of $4^{th}$ instar *A. gossypii* without wingbuds. FIG. 4F shows the results for 7 dpi of $4^{th}$ instar *A. gossypii* with wingbuds. The Y axis presents the percentage mortality (%); the X axis presents the different treatments UTC=Untreated Control; Ij wf GA17=*Isaria javanica* strain wf GA17; If Apopka97=*Isaria fumosorosea* strain Apopka 97; Bb GHA=*Beauveria bassiana* strain GHA; Mb F52=*Metarhizium brunneum* strain F52. Means with the same capital letters indicate no significant difference among treatments within time period, whereas means with the same lower-case letters indicate no differences within that treatment among time periods (Tukey's test, $\alpha$=0.05). * indicates significant difference between aphid type paralleled at a given treatment and dpi (P 0.05).

FIG. 5A shows the mortality at 14 dpi. FIG. 5B shows the mortality at 28 dpi. The Y axis presents the percentage mortality (%); the X axis presents the different treatments UTC=untreated control; Ij Wf GA17=*Isaria javanica* strain wf GA17; If Apopka97=*Isaria fumosorosea* strain Apopka 97; Bb GHA=*Beauveria bassiana* strain GHA; Mb F52=*Metarhizium brunneum* strain F52. Means with the same capital letters indicate no significant difference among treatments within time period, whereas means with the same lower-case letters indicate no differences within that treatment among time periods (Tukey's test, $\alpha$=0.05).

FIG. 6A shows the mortality at 14 dpi. FIG. 6B shows the mortality at 28 dpi. The Y axis presents the mortality percentage (%); the X axis presents the different treatments UTC=untreated control; Ij Wf GA17=*Isaria javanica* strain wf GA17; If Apopka97=*Isaria fumosorosea* strain Apopka 97; Bb GHA=*Beauveria bassiana* strain GHA; Mb F52=*Metarhizium brunneum* strain F52. Means with the same capital letters indicate no significant difference among treatments within time period, whereas means with the same lower-case letters indicate no differences within that treatment among time periods (Tukey's test, $\alpha$=0.05)

FIG. 7A shows the results for 7-day mortality. FIG. 7B shows the results for 14-day mortality. FIG. 7C shows the results for 7-day mycosis. FIG. 7D shows the results for 14-day mycosis. The Y axis presents the percentage mortality or mycosis (%); the X axis presents the different treatments Mb F52=*Metarhizium brunneum* strain F52; Ij wf GA17=*Isaria javanica* strain wf GA17; If Apopka97=*Isaria fumosorosea* strain Apopka 97; Bb GHA=*Beauveria bassiana* strain GHA. Bars for 10° C. data are white; bars for 15° C. data are filled-in with wide upper diagonal stripes; bars for 20° C. are filled-in with dark downward diagonal stripes; bars for 25° C. data are filled-in with trellis; bars for 30° C. data are filled-in with grey. Within each sub-graph, same upper-case letters indicate no significant difference among temperatures within the same fungal species, and same lower-case letters indicate no difference among fungal species within the same temperature (Tukey's test, $\alpha$=0.05).

FIG. 8A presents relative germination after exposure to 35° C. FIG. 8B presents relative germination after exposure to 40° C. The Y axis presents the relative germination (%), and the X axis presents the Log scale of the time of exposure in hours. Filled circles show data for *Metarhizium brunneum* strain F52; open circles show data for *Isaria javanica* strain wf GA17; filled triangles show data for *Isaria fumosorosea* strain Apopka 97; open triangles show data for *Beauveria bassiana* strain GHA. Within each sub-graph, same letters indicate no significant difference between fungi at each time; * means the starting time point when declined germination first appeared for each fungus, comparing with control (no heat treatment).

FIG. 9A presents mortality at 7 days. FIG. 9B presents mortality at 14 days. FIG. 9C presents mycosis at 7 days. FIG. 9D presents mycosis at 14 days. The Y axis presents the percentage mortality or mycosis (%), and the X axis presents the various fungi Mb F52=*Metarhizium brunneum* strain F52; Ij wf GA17=*Isaria javanica* strain wf GA17; If Apopka97=*Isaria fumosorosea* strain Apopka 97; Bb GHA=*Beauveria bassiana* strain GHA. Bars for data prior to exposure are filled with grey; bars for data 12 hours post-exposure are filled with trellis; bars for data 24 hours post-exposure are filled with dark upward diagonal stripes; bars for data 48 hours post-exposure are filled with wide upward diagonal stripes. Within each sub-graph, same upper-case letters indicate no significant difference among time of exposure within the same fungal species, and same lower-case letters indicate no difference among fungal species within the same exposure time (Tukey's test, $\alpha$=0.05).

FIG. 10A presents mortality at 7 days. FIG. 10B presents mortality at 14 days. FIG. 10C presents mycosis at 7 days. FIG. 10D presents mycosis at 14 days. The Y axis presents the percentage mortality or mycosis (%), and the X axis presents the various fungi Mb F52=*Metarhizium brunneum* strain F52; Ij wf GA17=*Isaria javanica* strain wf GA17; If Apopka 97=*Isaria fumosorosea* strain Apopka 97; Bb GHA=*Beauveria bassiana* strain GHA. Bars for data prior to exposure are filled with grey; bars for data 1 hours post-exposure are filled with trellis; bars for data 2 hours post-exposure are filled with dark upward diagonal stripes; bars for data 4 hours post-exposure are filled with wide upper diagonal stripes. Within each sub-graph, same upper-case letters indicate no significant difference among time of exposure within the same fungal species, and same lower-case letters indicate no difference among fungal species within the same exposure time (Tukey's test, $\alpha$=0.05).

FIG. 11A presents the germination data. FIG. 11B presents mortality data of *Galleria mellonella* larvae. FIG. 11C presents mycosis data of *G. mellonella* larvae. The Y axis presents the percent germination, mortality, or mycosis (%); and the X axis presents the various fungi: Mb F52=*Metarhizium brunneum* strain F52; Ij wf GA17=*Isaria javanica* strain wf GA17; If Apopka97=*Isaria fumosorosea* strain Apopka 97; Bb GHA=*Beauveria bassiana* strain GHA. Bars for data prior to temperature change are filled with grey; bars for data fungi 56 days at −20° C. are filled with upward diagonal stripes. Within each sub-graph, same upper-case letters indicate no significant difference among time of exposure within the same fungal species, and same lower-case letters indicate no difference among fungal species within the same exposure time (Tukey's test, $\alpha$=0.05).

FIG. 12A presents the germination data. FIG. 12B presents mortality data of *Galleria mellonella* larvae. FIG. 12C presents mycosis data of *G. mellonella* larvae. The Y axis presents the percentage germination, mortality, or mycosis (%); and the X axis presents the various fungi: Mb F52=*Metarhizium brunneum* strain F52; Ij wf GA17=*Isaria javanica* strain wf GA17; If Apopka97=*Isaria fumosorosea* strain Apopka 97; Bb GHA=*Beauveria bassiana* strain GHA. Bars for data prior to UV exposure are filled with grey; bars for data from fungi exposed 5 minutes to UV are filled with narrow upward diagonal stripes; bars for data from fungi exposed 10 minutes to UV are filled with wide upward diagonal stripes. Within each sub-graph, same upper-case letters indicate no significant difference among time of exposure within the same fungal species, and same lower-case letters indicate no difference among fungal species within the same exposure time (Tukey's test, $\alpha=0.05$).

BRIEF DESCRIPTION OF THE SEQUENCE LISTING

Figure 1A:
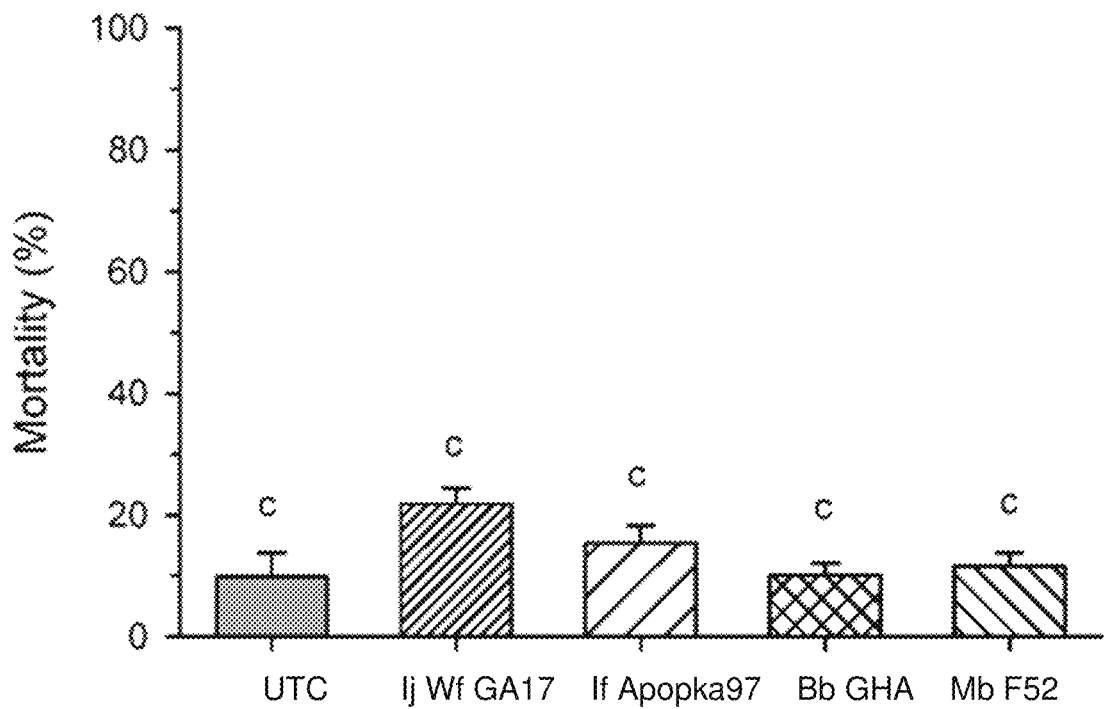
FIG. 1A to FIG. 1C depict graphs of the mortality of $4^{th}$ instar *Bemisia tabaci* (biotype B) exposed to various treatments for 3, 5, or 7 days post-inoculation (dpi) at 25° C. with a 14:10 photoperiod (L:D).

The nucleotide sequences disclosed in the specification are listed in Table 1, below.

| Sequence Identifier | Type | Description |
| --- | --- | --- |
| SEQ ID NO: 1 | nucleotide | ITS1-F primer |
| SEQ ID NO: 2 | nucleotide | ITS4 primer |
| SEQ ID NO: 3 | nucleotide | 983F primer |
| SEQ ID NO: 4 | nucleotide | 2218R |
| SEQ ID NO: 5 | nucleotide | *Isaria javanica* strain wf GA17 ITS locus sequence |
| SEQ ID NO: 6 | nucleotide | *Isaria javanica* strain wf GA17 tef gene sequence |

Deposit Under Terms of Budapest Treaty

The inventors have deposited samples of the new *Isaria javanica* wf GA17 strain with the Agricultural Research Service Patent Culture Collection (NRRL). NRRL is located at 1815 N. University Street, Peoria, Ill., USA 61604. All restrictions on the availability to the public of the deposited biological material identified herein will be irrevocably removed upon the granting of a patent.

The material was deposited on Mar. 12, 2020, and received NRRL Accession No 67939. The biological materials identified herein have been deposited under conditions such that access to the microorganisms are available during the pendency of the patent application to one determined by the Commissioner to be entitled thereto under 37 C.F.R. § 1.14 and 35 U.S.C § 122.

The deposited biological material will be maintained with all the care necessary to keep it viable and uncontaminated for a period of at least five years after the most recent request for the furnishing of a sample of the deposited microorganism, and in any case, for a period of at least thirty (30) years after the date of deposit for the enforceable life of the patent, whichever period is longer.

DETAILED DESCRIPTION

The present invention relates to an entomopathogenic fungus, in particular to biocontrol compositions comprising the *I. javanica* strain wf GA17 (or "Ij wf GA17"), methods of using such compositions for insect control, and kits comprising such Ij wf GA17 strain. In particular, this entomopathogenic fungi strain is a biopesticide that kills insect pests that feed directly on agricultural, horticultural, or vegetable crops. The Ij wf GA17 strain has been deposited with the Agricultural Research Service Patent Culture Collection and has received NRRL Accession No. 67939.

Virulence of the Ij wf GA17 fungal strain was compared with the virulence of commercial strains against several insect pests with different life history traits and habitats. Target pests included two hemipteran species feeding on the surface of cotton plants, the silverleaf whitefly *B. tabaci*—biotype B (Hemiptera: Aleyrodidae), and the cotton aphid *Aphis gossypii* Glover (Hemiptera: Aphididae); and three coleopteran pests, pecan weevil *Curculio caryae* (Horn) (Coleoptera: Curculionidae), citrus root weevil *Diaprepes abbreviatus* (L.) (Coleoptera: Curculionidae), and yellow mealworm, *Tenebrio molitor* L. (Coleoptera: Tenebrionidae). All of these insects are economically important pests. Larvae of *T. molitor* are pests of stored grains and are commonly used in evaluating pathogenicity and virulence of entomopathogens. *Aphis gossypii* has a broad host range, transmits many important viral diseases of plants, and may increase rapidly by asexual reproduction via alate or apterous females. The pecan weevil is a major pest in commercial pecan production, and its life cycle requires 2-3 years, with a few months spent infesting nuts in the canopy (as adults, eggs, and larvae) and the remaining period spent in soil (as diapausing larvae, pupae, and adults). *Diaprepes abbreviatus* is an invasive and devastating pest of citrus production in the state of Florida in the USA; it spends the larval, pupal, and teneral adult stages below ground, with significant injury resulting from larval feeding on citrus roots. These insects are examples of pests with diverse life histories, both of which occupy, above and below-ground habitats that are targeted with EPF.

The inventors isolated a wild fungus from field epizootics as a new strain of *I. javanica*, and named it wf GA17. Virulence tests using the Ij wf GA17 strain suggest that it has an equal or superior level of mortality to that achieved by commercial strains against some of the target insects. In particular, Ij wf GA17 caused the highest mortality of *B. tabaci*, superior to *I. fumosorosea* Apopka 97, *M. brunneum* F52, and *B. bassiana* GHA, at 5 dpi in both mortality and mycosis development. Ij wf GA17 performed similarly to If Apopka 97 in dose-response bioassays against *T. molitor*, and in the virulence test on *A. gossypii* nymphs, *C. caryae* larvae, and *D. abbreviatus* larvae.

*Isaria* spp. have been known to naturally infect whiteflies and have potential to cause fungal epizootics. For example, an *Isaria* sp. was found causing natural epizootics in *B. tabaci* in the Lower Rio Grande Valley of Texas in 2001 and was identified as *I. poprawskii*, a new entomopathogenic species closely related to *I. javanica*. Additionally, the use of *Isaria* spp, particularly *I. fumosorosea*, for managing whiteflies has been reported in a number of studies. In the instant disclosure, against *B. tabaci*, both *Isaria* strains (Ij wf GA17 and If Apopka 97) were superior to *M. brunneum* and *B. bassiana*, especially the wild strain Ij wf GA17 performed best at 5 dpi. In a similar study conducted by Mascarin et al., *I. fumosorosea* isolates did not appear to be significantly different from *B. bassiana* isolates in causing mortality of the $2^{nd}$ instar nymphs of *B. tabaci* biotype B at 8 days after treatment, but they had relatively shorter time to reach 50% germination ($GT_{50}$s) (3 to 4 days) compared to *B. bassiana* strains (4 to 6 days) (Mascarin, G. M., et al., 2013, "The virulence of entomopathogenic fungi against *Bemisia tabaci* biotype B (Hemiptera: Aleyrodidae) and their conidial production using solid substrate fermentation," BioControl 66: 209-218). In the same study against adult whiteflies, all *I. fumosorosea* isolates had higher sporulation than *B. bassiana* isolates 7 days after exposure to the treated leaf surface. Despite the target stages being different from the instant disclosure ($4^{th}$ instars), it was observed that *Isaria* spp. had an advantage over the muscardine fungi, including *B. bassiana*, in early stage infection and sporulation, but all fungi caused similar levels of insect mortality in the late phase.

In addition to whiteflies, *Isaria* spp. may suppress many other sap-feeding insects including aphids, such as *A. gossypii*, black pecan aphid *Melanocallis caryaefoliae* (Davis), brown citrus aphid, *Toxoptera citricidus* (Kirkaldy), and green peach aphid, *Myzus persicae* (Sulzer). In the current study, similar to the test on *B. tabaci*, the *I. fumosorosea* and *I. javanica* strains were superior to *B. bassiana* in causing both mortality and mycosis development in *A. gossypii*, especially in nymphs without wingbuds. In general, comparing with *I. fumosorosea* and *I. javanica* strains, *M. brunneum* caused similar levels of aphid mortality but lower levels of mycosis development. This may be because *M. brunneum* requires more time to grow and sporulate. Similar to the findings reported herein, *M. brunneum* F52 (Mb F52) has been reported to cause similar levels of mortality of black pecan aphid *M. caryaefoliae* ($4^{th}$ instars with wingbuds) as *I. fumosorosea* ATCC 20874 (=strain Apopka 97) at $10^7$ spores/ml. This mortality is significantly higher than the one seen with *B. bassiana* GHA at 3 dpi and 4 dpi. Surprisingly, the *M. caryaefoliae* with wingbuds was more susceptible to fungal infection in general compared to the *M. caryaefoliae* without wingbuds.

The fungus disclosed herein may be used to kill horticultural or agricultural crop insect pests such as Homopteran or Curculionidae, for example. Homopteran (or Sternorrhyncha, suborder of Hemiptera), any of more than 32,000 species of sucking insects, the members of which exhibit considerable diversity in body size. All of the Homopterans are plant feeders, with mouthparts adapted for sucking plant sap from a wide assortment of trees and wild and cultivated plants. The Curculionidae are the family of the "true" weevils (or "snout beetles"). They are one of the largest animal families, with 6,800 genera and 83,000 species described worldwide. They include the bark beetles as the subfamily Scolytinae, which are modified in shape in accordance with their wood-boring lifestyle. The most defining characteristic of the weevils is the proboscis, which can be short and wide or long and slender. The chewing mouthparts are reduced in size and can be seen at the very end of the proboscis. The head is prolonged and leans forward to fit into the snout, and the antennae protrude from the sides of the snout. The 5-segmented tarsi are noticeable which help with identification. As a common defense mechanism, these beetles will sing by rubbing their elytra against their abdomen. The scarabaeiform larvae, also known as the white grub, can be seen burrowing in twigs, and large nuts.

A biocontrol composition comprising Ij wf GA17 kills or reduces homopteran and curculionid pests and other insect pests in the orders of Diptera (mushroom flies *Lycoriella* and *Megaselia* spp., leafminer *Liriomyza* spp.), Coleoptera (black vine weevil, root weevils, crown weevils, nut weevils, rootworms, wireworms, Japanese beetle grubs). Thysanoptera (thrips), Lepidoptera (citrus leafminers, caterpillars). Hemiptera (whiteflies *Bemisia* and *Trialeuroides* spp., aphids, mealybugs, psyllids, and plant bugs *Lygus* spp.), and mites (spider mites, broad mites, rust mites).

As seen in Example 4 of the instant disclosure, *I. javanica* wf GA17 and *I. fumosorosea* Apopka 97 strains caused moderate *D. abbreviatus* larval mortality of 12% by 14 dpi. At 28 dpi Ij wf GA17 caused 25% larval mortality, and If Apopka 97 caused 33% larval mortality, with last instar *D. abbreviatus* larvae exposed to a drenched soil surface. These observed efficacy levels were similar to those reported by Avery et al., in which a topical spray application at $10^7$ blastospores per ml of Ifr strain 3581 caused an average of 13% mortality of *D. abbreviatus* $3^{rd}$ to $4^{th}$ instars at 14 days after treatment in the laboratory, and a soil drench application made with the same blastospore concentration provided no significant larval control (only 2-4% mortality) in the greenhouse (Avery P. B., et al., 2016, "Efficacy of topical application, leaf residue or soil drench of blastospores of *Isaria fumosorosea* for citrus root weevil management: laboratory and greenhouse investigations," Insects 7: 66). Similarly, topical application of the fungus is said to cause similar mortality of larvae and adults, while 100% mortality is said to occur in adults feeding on leaves treated with blastospores. This was consistent with the study, in which Apopka 97 applied at $10^7$ blastospores per ml also caused 100% mortality of adults feeding on treated leaves.

Both *B. bassiana* and *M. brunneum* infect curculionids, which are listed on the labels of their commercial products. Among the four fungal strains tested in the instant disclosure. *B. bassiana* caused the highest mortality of both *C. caryae* and *D. abbreviatus* larvae. Against *D. abbreviatus* larvae, it exhibited a significantly higher level of mortality compared to *M. brunneum* at 28 dpi. Consistent with the findings reported herein, it was previously reported that by rolling insects over the sporulating cultures of fungi, at 12 dpi *B. bassiana* caused 76.9% larvae mortality and 92.7% adult mortality, whereas *M. anisopliae* resulted in 0% larval mortality and 6.7% adult mortality (Beavers J. B., et al., 1972, "Two muscardine fungi pathogenic to *Diaprepes abbreviates*," Fla. Entomologist 55: 117-120). As seen in Example 4, *B. bassiana* caused high mortality and mycosis (50% at 14 dpi and 75% at 28 dpi) in *C. caryae* larvae exposed directly to the treated soil surface. In practical situations, *B. bassiana* is repelled by the antibiotic effects of the soil cell formed around the larvae during diapause, which may limit the actual control success when the insect is in the cell. However, this is not an issue when targeting the larvae burrowing into soil or adults emerging from the soil.

In summary, in the studies disclosed herein, *I. javanica* wf GA17 and *I. fumosorosea* Apopka 97 strains caused the highest mortality and most advanced mycosis development against the sap-sucking nymphs of *B. tabaci* and *A. gossypii*. In particular, the wild strain wf GA17 exhibited the highest infection of *B. tabaci*, significantly higher than Apopka 97 and the muscardine fungi Mb F52 and Bb GHA. Thus, the Ij wf GA17 is a strain that may be used as an alternative to, and possibly a replacement of, Apopka 97 for managing whiteflies. Against the soil inhabiting larval stage of both weevils, *B. bassiana* GHA had the highest infection levels.

Under environmentally relevant temperatures (20° C. to 30° C.), virulence of Ij wf GA17 followed a similar pattern to other fungi, with highest virulence at 25° C., followed by 20° C. and 30° C., delayed virulence at 15° C., and low virulence at 10° C. However, in early observations, at 7 dpi, Ij wf GA17 and If Apopka 97 tended to have lower virulence than Mb F52 and Bb GHA. At 30° C., in observations at 14 dpi, all fungi caused reduced mycosis when compared with observations at 25° C. Particularly, Mb F52 caused lower mycosis than the other fungi. At 35° C., no fungi showed mycosis development. This was probably due to inhibition of fungal viability and virulence, and competition from saprophytic fungi and bacteria, which outgrew the entomopathogenic fungi under the high temperature. Others have compared the growth of Mb F52 and Bb GHA under various temperatures, and found that the growth of both fungi increased as temperature increased to 28° C., and then decreased at higher temperatures; at 35° C., Bb GHA barely grew, and Mb F52 grew at 5% of the fastest growth rate. This is consistent with the pattern disclosed herein, although 28° C. was not included in the test reported here. In addition, others have reported no infection of *B. bassiana, M. anisopliae,* or *Paecilomyces fumosoroseus* (*I. fumosorosea*) at 35° C. under which *G. mellonella* was exposed to pine litter as a "bait." The highest activity of *M. anisopliae* occurred at 30° C., *B. bassiana* at 25° C., and activity of *P. fumosoroseus* appeared at 15-25° C. only, with optimum fungal growth rates at 27.5, 25, and 25° C., respectively. This pattern is similar to the findings disclosed herein, except that in Example 6 *M. brunneum* appeared less tolerant to high temperatures and had lower virulence at 30° C. than at 25° C., which was probably due to strain difference. *Isaria* sp., which was later identified as *I. poprawskii* sp. nov., and is closely related to *I. javanica*, does not grow at constant 35° C. for 7 days, but has optimum growth at 30° C. This is different from the optimum virulence at 25° C. and reduced virulence at 30° C. shown for Ij wf GA17 in the instant disclosure, suggesting that the two species apparently differ in temperature tolerance.

In Example 6, Ij wf GA17 showed lower tolerance than Mb F52 and Bb GHA to high temperatures of 35° C. and 40° C. in both viability and virulence. *I. fumosorosea* strain ARSEF 3889 has been shown to have lower tolerance than *M. brunneum* ARSEF 1187 and *B. bassiana* ARSEF 252, while *M. brunneum* ARSEF 1187 had a lower $GT_{50}$ of conidial germination than *B. bassiana* ARSEF 252 (1.83 versus 3.54 hours) at 45° C. for 48-hour germination (Souza R. K. F., et al., 2014, "Conidial water affinity is an important characteristic for thermotolerance in entomopathogenic fungi," Biocontrol Sci. Technol. 24: 448-461). In Example 6, Mb F52 is shown to have higher $GT_{50}$ than Bb GHA at 35° C. (26.3 versus 19.5 hours) but slightly lower at 40° C. (2.2 versus 2.5 hours). Such a difference may be due to differences in strains and temperatures. Consistent with the data disclosed herein, others have found that Mb F52 had slightly higher tolerance than Bb GHA to 35° C. and had higher growth rate.

As seen in Example 6, superior heat tolerance in Ij wf GA17 over If Apopka 97 was observed at the high temperatures of 35° C. and 40° C. in both conidia viability and virulence. However, these advantages may be compromised or diminished at even longer exposure to higher temperatures, given that neither fungus survives long-term exposure (lost viability by 24 hours at 35° C. and 4 hours at 40° C. or earlier). This phenomenon was also seen in Example 6 for all four fungi tested; additionally, the conidia was observed to eventually lose viability after a longer time of heat treatment. *Isaria* sp. has been shown not grow when held at a constant 35° C. for 7 days, but was able to recover and grow when transferred to 25° C., with no recovery or growth occurring at either constant 40° C. or when transferred from 40° C. to 25° C. (Cabanillas H. E. and Jones W. A., 2009, "Effects of temperature and culture media on vegetative growth of an entomopathogenic fungus *Isaria* sp. (Hypocreales: Clavicipitaceae) naturally affecting the whitefly, *Bemisia tabaci* in Texas," Mycopathologia 167: 263-271). This indicates that in short time heat stress, germination and growth of the fungus may be suppressed and retarded; for longer time or higher temperature of exposure, however, the damage may become irreversible and the fungus may lose viability permanently.

The ability of EPF conidia to tolerate extremely low temperatures is also important for storage, transportation, and field persistence. This is particularly true in the areas with a cold winter climate. Similar to tolerance of high temperatures, Ij wf GA17 had higher viability and virulence at low temperature than If Apopka 97, and lower virulence than Bb GHA and Mb F52. However, Ij wf GA17 only had lower germination than Mb F52; while Bb GHA had the lowest germination, but its virulence was not affected, probably because the amount of survived conidia was adequate to infect the host. *B. bassiana* strain ARSEF 252 is more cold-active than *Metarhizium* spp. isolates at 5° C. Similarly, Bb GHA has been shown to have higher growth rate than Mb F52 at 8° C. Thus, the trends observed by others are different from those in Example 6, yet this may be explained by the fact that the temperatures examined were lower than those used in prior studies.

The effect of UV on Ij wf GA17 virulence was similar to the effect seen on other fungi. Although Ij wf GA17 had higher insect mortality than If Apopka 97 and Bb GHA after 5-minute exposure to UV, it caused similar levels of mycosis to other fungi. In contrast, If Apopka 97 caused lower mortality than Mb F52 and Ij wf GA17 after 5-minute UV treatment, and lower than Mb F52 and Bb GHA after 10-minute UV treatment, although the mycosis levels were not different. It is worthwhile to mention that, *B. bassiana* GHA had marginally higher viability than the other fungi tested. *B. bassiana* isolates have stronger tolerance to UV-B (≥295 nm) than *M. anisopliae* and *I. fumosoraosea* isolates; with the latter isolates being the most susceptible. The results shown in Example 7 followed a similar pattern, but the intensity of UV light used (254 nm) in this example was too strong to more clearly separate the fungi in their UV susceptibility.

Delayed germination after 40-hour incubation appeared in all fungi exposed to UV light for 5 minutes. Delayed germination of EPF in response to UV light has been reported, but the UV wavelengths in these studies belong to either UV-A or UV-B, which are less intensive to that used in the Example 7. The delay in germination suggests that part of the damage caused by short UV exposure may be repaired before germination occurs. However, similar to heat stress, the damage caused by UV may be permanent and irreversible with longer time of UV exposure. In the current study, 10 minutes (or longer in the preliminary test) of UV exposure killed almost all fungal spores. When the dishes containing the fungus were incubated longer than 40 hours, very few fungal colonies appeared. The mechanism of damage repair in stress tolerance may also apply to heat stress, as delayed germination occurred after 35° C. and 40° C. treatment, regardless of the fungi treated.

As seen in Example 5, under environmentally important temperatures, Ij wf GA17 responded similarly to commercial strains, with optimum virulence at 25° C. Fungal virulence and viability were inhibited by high temperatures. The tolerance of Ij wf GA17 to extremely low or high temperatures was inferior to Mb F52 and Bb GHA, but it was superior to If Apopka 97. As seen in Example 7, Ij wf GA17 had similar response to UV light as other fungi, and had marginally lower viability than Bb GHA when exposed to UV light. The advantage of Ij wf GA17 over If Apopka 97 in environmental tolerance makes it a good alternative to, or even a good replacement of If Apopka 97 in pest management. The Ij wf GA17 strain showed higher virulence than If Apopka 97 against *B. tabaci* (biotype B) and similar effect against *A. gossypii*, which indicate its good potential for managing foliar-feeding pests such as whiteflies. However, weather conditions and the time of spray should be taken into account for field applications to avoid direct exposure of fungal propagules to excessive heat and UV radiation.

Agricultural and/or horticultural crops affected by insect pests may be cole crops, such as brussels sprouts, cabbage, cauliflower, collards, kale, kohlrabi, mustard, broccoli, turnip; Cucurbitaceae such as cucumber, melon, squash, pumpkin, colocynth, gourds; row crops such as cotton, soybean, corn, sorghum, millet, wheat, and other crops vulnerable to aphid and whitefly infestations; orchard crops such as stone fruits, pome fruits, pecan, citrus, and other horticultural and agricultural crops susceptible to weevil pests.

In the present disclosure, "*Isaria javanica* strain GA17," "*Isaria javanica* wf GA17," "Ij wf GA17," and "wf GA17" are used interchangeably, and refer to the entomopathogenic strain isolated from infected silverleaf whiteflies, and shown to kill insects.

As used in the present disclosure, "*I. fumosorosea* strain Apopka 97," "If Apopka 97," and "ATCC 20874" are used interchangeably and refer to the *Isaria fumosorosea* strain identified by Lance S. Osborne, University of Florida, Apopka, Fla., USA, and found in the PFR-97 pesticide (Certis USA LLC; Columbia, Md., USA).

As used herein, "*B. bassiana* strain GHA," and "Bb GHA" are used interchangeably and refer to the *Beauveria bassiana* strain identified by Mycotech Corporation, now Lam International Co., Butte, Mont., USA, and found in the BOTANIGARD biopesticide 22WP (Lam International Co., Butte, Mont., USA).

As used herein, "*M. brunneum* strain F52," and "Mb F52" are used interchangeably and refer to the *Metarhizium brunneum* strain identified by Earth Biosciences, now Novozyme Biologicals, Salem, Va., USA, and found in the MET52EC insecticide (Novozymes, Salem, Va., USA).

As used herein, the term "about" is defined as plus or minus ten percent of a recited value. For example, about 1.0 g means 0.9 g to 1.1 g.

Unless otherwise explained, all technical and scientific terms used herein have the same meaning as commonly understood by one of ordinary skill in the art to which this disclosure belongs. The singular terms "a", "an", and "the" include plural referents unless context clearly indicates otherwise. Similarly, the word "or" is intended to include "and" unless the context clearly indicate otherwise.

Embodiments of the present invention are shown and described herein. It will be obvious to those skilled in the art that such embodiments are provided by way of example only. Numerous variations, changes, and substitutions will occur to those skilled in the art without departing from the invention. Various alternatives to the embodiments of the invention described herein may be employed in practicing the invention. It is intended that the included claims define the scope of the invention and that methods and structures within the scope of these claims and their equivalents are covered thereby. All publications, patents, and patent applications mentioned in this specification are herein incorporated by reference to the same extent as if each individual publication, patent, or patent application was specifically and individually indicated to be incorporated by reference.

EXAMPLES

Having now generally described this invention, the same will be better understood by reference to certain specific examples, which are included herein only to further illustrate the invention and are not intended to limit the scope of the invention as defined by the claims.

Example 1

Fungus Isolation and Identification

A fungus was isolated from infected silverleaf whiteflies. Using sequence similarities, the newly isolated fungus was identified as a new *Isaria javanica* strain, and was given the designation wf GA17.

A wild fungus was isolated from infected silverleaf whiteflies located in commercial cotton fields in Tifton, Ga., USA in late August 2017. Single colony isolation was made following the method described by Inglis G. D. et al. (2012, "Laboratory techniques used for entomopathogenic fungi: Hypocreales. Lacey L. (Ed.) Manual of Techniques in Invertebrate Pathology, $2^{nd}$ edition, Academic Press, San Diego, Calif., USA pp. 189-253). Isolated colonies were cultured on potato dextrose agar (PDA; DIFCO tissue culture reagents; Becton Dickinson and Company, Franklin Lakes, N.J., USA) and incubated at 25° C. (L:D 0:24 light cycle) for 7-10 days to allow for sporulation.

The fungus strain was initially characterized using morphological characters (colony morphology, conidiophores, and conidia). The strain was grown on PDA for 7 days at 25 C. Asexual structures were examined and photographed at 600× using an Olympus BX51 phase contrast microscope equipped with an Olympus DP2-SAL camera (Olympus Life Science, Waltham, Mass., USA).

To determine the species of the fungus, primers known to amplify the internal transcribed spacer (ITS) locus and translation elongation factor (tef) gene were used to amplify genomic DNA, and after sequencing, BLAST searches were used to identify the species. DNA was extracted from mycelia obtained from 7-day old cultures growing in potato dextrose broth at 25° C. One hundred mg of fungal mycelia (dry weight) was used for DNA extraction using the Qiagen DNeasy Plant Mini Kit (Qiagen; Valencia, Calif., USA). Eluted DNA was quantified using a spectrophotometer (Eppendorf BioPhotometer; Hauppage, N.Y., USA) and stored at −20° C. until use. Two DNA extractions were obtained and both samples analyzed. The strain was deposited to the Agricultural Research Service Patent Culture Collection (NRRL), on 12, March 2020, and received NRRL accession No. 67939.

The DNA from the ITS locus was amplified using primers ITS1-F (5'-CTTGGTCATTT AGAGGAAGTA, set forth in SEQ ID NO: 1) and ITS4 (5'-TCCTCCGCTTATTG ATATGC, set forth in SEQ ID NO: 2) (White T. J. et al., 1990, "Amplification and direct sequencing of fungal ribosomal RNA genes for phylogenetics," In: Innis M. A., Gelfand, D. H., Sninsky, J. J., White, T. J. (Eds.), PCR Protocols, a Guide to Methods and Applications. Academic Press, San Diego, Calif., pp. 315-322). The tef gene was amplified using primers 983F (5-GCTCCTG GACATCGTGACTTCAT, set forth in SEQ ID NO: 3), and 2218R (5'-ATGACACCGACAGC GACGGTCTG, set forth in SEQ ID NO: 4) (Carbone I. and Kohn L. M., 1999, "A method for designing primer sets for speciation studies in filamentous ascomycetes," Mycologia 91: 553-556). Amplification conditions were as follows for both the ITS locus and tef gene: initial denaturation at 95° C. for 4 minutes, followed by 35 cycles of 95° C., 55° C., and 72° C. for 50, 60 and 60 seconds, respectively, with a final extension of 10 minutes at 72° C. The amplification products were purified using QiaQuick PCR Purification Kit (Qiagen). Sequencing was performed using the BIGDYE Terminator chemistry and AmpliTaq-FS DNA polymerase (Applied Biosystems, Foster City, Calif., USA) at the Cornell University Biotechnology Resource Center. Obtained sequence data were submitted to BLAST searches to place the fungus to species. Sequences for ITS locus and tef gene were submitted to GenBank, and were given accession no. MN453283, and accession no. MN461230, respectively.

The fungus isolated from silverleaf whitefly epizootics in cotton fields in Georgia, USA in 2017 was identified as *Isaria javanica*. In vitro cultures on PDA showed colonies with *Isaria* morphology. On PDA, colonies were at first white turning light yellow with grayish violet, and with cottony, dense mycelia in the center; phialides in whorls and with swollen base tapering to a thin neck; and with fusiform dry conidia in chains. Sequencing of the ITS and the tef placed the fungus in the species *I. javanica*. The ITS sequence showed 100% (533 to 563 bp) similarity with CBS 134.22 from Coleoptera, TBRC 7259 and TBRC 7260 from Lepidoptera, and CHE-CNRBC 303 from a Hemiptera (*B. tabaci*). The tef sequence had 99% (918 bp) similarity with CBS 134.22, 100% (866 bp) similarity with TBRC 7259, 99% (866) similarity with TBRC 7260, and 100% (928 bp) similarity with CHE-CNRBC 303.

The results shown in this example identify the newly isolated fungus strain as belonging to the *I. javanica* species.

Example 2

Pathogenicity

The newly isolated *I. javanica* wf GA17 strain infects *T. molitor. G. mellonella*, and *C. caryae* last instars.

Insects used in the pathogenicity and virulence tests included the last instars of *Galleria mellonella* L. (greater wax moth), *T. molitor, C. caryae*, and *D. abbreviatus*, and nymphs of *B. tabaci*, and *A. gossypii, T. molitor* and *G. mellonella* were obtained from commercial vendors who supply the insects as fish bait or pet food. *T. molitor* was obtained from Southeastern Insectaries; Perry, Ga., USA; *G. mellonella* was purchased from Vanderhorst Wholesale, Inc; St. Marys, Ohio, USA. Last instars of *C. caryae* were collected from infested pecan nuts from September to October at Byron, Ga., USA (32.6574 N, −83.7387 W) and were stored in soil outdoors, near the pecan trees before use. *D. abbreviatus* were obtained from the USDA-ARS, Subtropical Insects and Horticulture Research Unit in Fort Pierce, Fla., USA. *B. tabaci* immatures were obtained by caging approximately 100 adult whiteflies per cotton plant (with ≥3 true leaves) to lay eggs for 24 hours. Cotton plants were held for 2 weeks at 27° C. (L:D 14:10) for development of *B. tabaci* to the required stage. *A. gossypii* nymphs were obtained by caging approximately 10 dark-green apterous adults, which reproduce asexually, per cotton plant for 7-10 days at 27° C. to allow for nymph development.

Koch's postulates (Lacey L. A., Brooks W. M., 1997, "Initial handling and diagnosis of diseased insects," In: Lacey, L. A. (Ed.), Manual of Techniques in Insect Pathology. Academic Press, Inc., San Diego, pp. 1-15) were used to determine insect pathogenicity of the fungus to several insects, including larvae of *T. molitor, G. mellonella*, and *C. caryae*, with 5-10 insects per species. The insects were allowed to crawl on the surface of the sporulated fungal culture in a 90-mm petri dish for 15 minutes. Then, *T. molitor* and *G. mellonella* were transferred to a clean petri dish lined with a single layer of filter paper pre-moistened with 1 ml distilled water; *C. caryae* larvae were transferred individually to solo cups filled with autoclaved soil (10 g, 14% v/w moisture). Each insect species had an untreated control, in which insects were placed in pre-moistened filter paper without exposure to the fungus. Insect death and mycosis were recorded at 5 days post inoculation (dpi). The fungus was re-isolated from infected insect cadavers to confirm it was the same as the fungus that was originally isolated.

Fungal pathogenicity was confirmed in all three insects. In the test of Koch's postulates, 80% of *T. molitor*, and 100% of *G. mellonella* and *C. caryae* were infected with the fungus; the untreated control for each species had no fungal infection.

Example 3

Effect on *T. Molitor*

The newly isolated Ij wf GA17 strain caused *T. molitor* death in a similar manner as If Apopka 97.

Fungi *I. fumosorosea* strain Apopka 97 (If Apopka 97), *B. bassiana* strain GHA (Bb GHA), and *M. brunneum* strain F52 (Mb F52) were cultured from the commercial products PFR-97 pesticide (Certis USA LLC; Columbia, Md., USA), BOTANIGARD biopesticide 22WP (Lam International Co., Butte, Mont., USA), and MET52EC insecticide (Novozymes, Salem, Va., USA), respectively. All fungi were cultured on potato dextrose agar for 7-10 days at 25° C. (L:D 0:24) and then stored at 4° C. for up to 2 weeks before use. Spores were harvested by washing the media surface with sterile 0.05% SILWET L-77 organosilicone surfactant for use in agriculture (Momentive Performance Materials Inc.; Waterford, N.Y., USA) and gently scratching the surface with a sterilized blade. The mixtures were transferred to 50 ml centrifuge tubes with several 6 mm glass beads which were added to agitate mixing and break-up spore clusters. Spore suspensions were vigorously vortexed for 5 minutes until spore clusters were broken apart and thoroughly mixed. Spore concentrations were determined by loading a hemocytometer with 10 μl of serially-diluted suspensions with approximately $10^7$ spores/ml; spores were counted at 400× magnification. At least four samples were used to obtain an average spore concentration for each fungus. Specified concentrations for treatment were serially diluted from the original suspension with 0.05% SILWET L-77 as the solvent. Before use, spore viability was determined by spreading 0.1 ml suspension of $10^6$ spores/ml in PDA with 1% yeast extract in a 60-mm Petri dish, incubating at 25° C. for 16 hours, and observing at 400× magnification the germination rate of the first 200 conidia encountered. Spore viability was ≥91.5%, and was taken into account when calculating application rates of viable spores.

A laboratory bioassay was conducted to compare the virulence of strain wf GA17 to If Apopka 97 using *T. molitor* larvae exposed to various spore concentrations ($10^6$, $5\times10^6$, $10^7$, $5\times10^7$, $10^8$, $5\times10^8$ viable spores/ml) in addition to an untreated control. The test was conducted in both 35 mm Petri dishes and soil cups. Each petri dish was lined up with a single layer of 30 mm Whatman® Grade 1 sterilized filter paper (Whatman International Limited Corporation, Kent, England) and received 0.1 ml fungal suspension, followed by 0.05 ml of distilled water. The control dish received 0.1 ml sterile 0.05% SILWET L-77 organosilicone surfactant for use in agriculture and 0.05 ml of distilled water. Each 30-ml soil cup contained 10 g dry soil, and received 1 ml fungal suspension, followed by 0.4 ml distilled water to reach a final soil moisture of 14%. The control cup received 1 ml sterile 0.05% SILWET L-77 organosilicone surfactant for use in agriculture and 0.4 ml of distilled water. The soil was first autoclaved and then dried in an oven before use. Each petri dish or soil cup received one *T. molitor*. There were 10 petri dishes or soil cups for each treatment. The experiment was conducted in six trials, replicated by time and batches of fungal culture. Insect mortality and mycosis was evaluated at 7 and 14 dpi.

Virulence of Ij wf GA17 was further compared to three commercial fungal strains, If Apopka 97, Bb GHA, and Mb F52, against two homopterans, *B. tabaci* and *A. gossypii*, and two curculionid pests, *C. caryae* and *D. abbreviatus*. The test on *B. tabaci* was conducted using 4th instars (60-80/replicate). *A. gossypii* was tested using 4th instars with or without wingbuds (10/replicate), with aphid type and fungal treatment nested as factors. Both *B. tabaci* and *A. gossypii* nymphs were tested on leaf discs in 1.5% water agar in a 90-mm petri dish. A Potter spray tower (Burkard Scientific Limited, Uxbridge, Middx, UK) was used to deliver the fungal spores to the dish. The spray tower was equipped with an intermediate atomizer and delivered treatments at 69 kPa with a 5 second settling period. Fungal applications were made in a 2 ml spore suspension of $10^7$ spores/ml. The untreated control consisted of 2 ml 0.05% SILWET L-77 organosilicone surfactant for use in agriculture. The spray tower was calibrated to deliver $5.7 \times 10^3$ spores/cm$^2$. After application, the dishes were sealed with parafilm to prevent fungal contamination, and to keep the leaf discs from drying and insects from escaping. Last instars of *C. caryae* and *D. abbreviatus* were tested in 30-ml SOLO disposable cups (Solo Cup Company, Lake Forest, Ill., USA) filled with 10 g dry autoclaved soil. Fungal treatments were applied using a 1 ml suspension of $10^8$ spores/ml, followed with 0.4 ml distilled water to reach a final soil moisture of 14% v/w. The control cup received 1 ml 0.05% SILWET L-77 organosilicone surfactant for use in agriculture and 0.4 ml of distilled water. Each soil cup held one insect, with 10 cups used per experimental unit replicated three times. All experiments were repeated in two trials. *B. tabaci* and *A. gossypii* mortality and percentage mycosis were evaluated at 3, 5 and 7 dpi; *C. caryae* and *D. abbreviatus* mortality and mycosis levels were recorded at 14 and 28 dpi.

Dose response assays of strains Ij wf GA17 and If Apopka 97 were analyzed with probit analysis (Proc Probit, SAS 9.4) (SAS Institute Inc., 2016; Cary, N.C., USA). Differences between $LC_{50}$s were compared using the method described in Roberson J. L., et al. (2017. Bioassays with arthropods. 3$^{rd}$ ed. Boca Raton, Fla.: CRC Press, Taylor & Francis Group). whereby the 95% CL of response ratio at 50% mortality ($RR_{50}$) including 1 indicate no significant difference between $LC_{50}$s. Relationships between insect mortality and mycosis level in dose response assays was analyzed with Pearson's correlation coefficients (Proc Corr, SAS 9.4). Dose-Response of *I. javanica* Wf GA17 Versus *I. fumosorosea* Apopka 97 in *T. molitor*

When Ij wf GA17 and If Apopka 97 were tested against *T. molitor* in Petri dishes lined with filter paper (paper) and in soil cups (soil) at 7 and 14 dpi, no significant difference was detected between the two fungi in either substrate or at either observation time. Although the soil cups received more spores (1 ml versus 0.1 ml for each concentration) than the filter paper in petri dishes, both fungi had higher $LC_{50}$s (less virulent) in soil test than in filter paper at 7 dpi but not at 14 dpi. There was a strong correlation between mortality and mycosis level at all observations for both fungi (Pearson correlation coefficient ≥0.87, P<0.0001), indicating insect death was caused by fungal infection.

The results of the dose response of *Isaria javanica* strain wf GA17 (Ij wf GA17) and *Isaria fumosorosea* strain Apopka 97 (If Apopka 97) to the yellow mealworm *Tenebrio molitor* at 7 and 14 days post inoculation (dpi) in filter paper and soil tests are shown in Table 2, below.

TABLE 2

Dose Response to *T. molitor*

| Fungus | Substrate | Dpi | Slope ($\log_{10}$ (dose)) mean ± sem | P value $^a$ | LC50 (×10$^7$) (viable spores/ml) Dose | 95% CL | RR$_{50}$ (95% CL)$^b$ |
|---|---|---|---|---|---|---|---|
| If Apopka 97 | paper | 7 | 0.53 + 0.12 | <0.0001 | 3.58 | 1.38-11.49 | 1.04 (0.38-2.80) |
| Ij wf GA17 | paper | 7 | 0.58 + 0.12 | <0.0001 | 3.46 | 1.50-9.26 | — |
| If Apopka 97 | paper | 14 | 0.71 + 0.15 | <0.0001 | 0.17 | 0.03-0.42 | 1.00 (0.60-1.67) |
| Ij wf GA17 | paper | 14 | 0.70 + 0.13 | <0.0001 | 0.17 | 0.04-0.40 | — |
| If Apopka 97 | soil | 7 | 0.46 + 0.09 | <0.0001 | 48.75 | 18.87-281.75 | 0.66 (0.25-1.79) |
| Ij wf GA17 | soil | 7 | 0.47 + 0.09 | <0.0001 | 73.60 | 26.41-520.49 | — |
| If Apopka 97 | soil | 14 | 0.47 + 0.12 | 0.0001 | 0.06 | 0.01-0.24 | 0.31 (0.07-1.41) |
| Ij wf GA17 | soil | 14 | 0.57 + 0.12 | <0.0001 | 0.20 | 0.03-0.52 | — |

$^a$ P < 0.05 indicates the model was significant.
$^b$ RR$_{50}$ = LC$_{50}$ (If Apopka 97)/LC$_{50}$ (Ij wf GA17); if 95% CL include 1, the LC$_{50}$s of the two fungi were not significantly different.

The data in this Example confirms that fungal infection by Ij wf GA17 causes *T. molitor* death.

Example 4

Effect on Homopterans and Curculionid Pests

The mortality caused by the newly isolated Ij wf GA17 strain was similar to the mortality caused by Apopka 97 at 5 dpi on 4$^{th}$ instar *Bemisia tabaci* (biotype B), *A. gossypii* nymphs with wingbuds, and *D. abbreviatus* larvae. Ij wf GA17 and If Apopka 97 had equal levels of mycosis development at 5 dpi and 7 dpi.

The effects of treatment and time on insect mortality and mycosis in the virulence test against two homopteran and two curculionid pests were analyzed by repeated measures ANOVA (Proc Mixed, SAS 9.4). To meet equal variance assumptions, all data were arcsine square root transformed before analysis; however, back-transformed data are presented in all figures. Data from experimental trials were combined for analysis using trial as a block factor. Mean separations between treatments were made using the Tukey's test ($\alpha$=0.05).

Figure 1B:
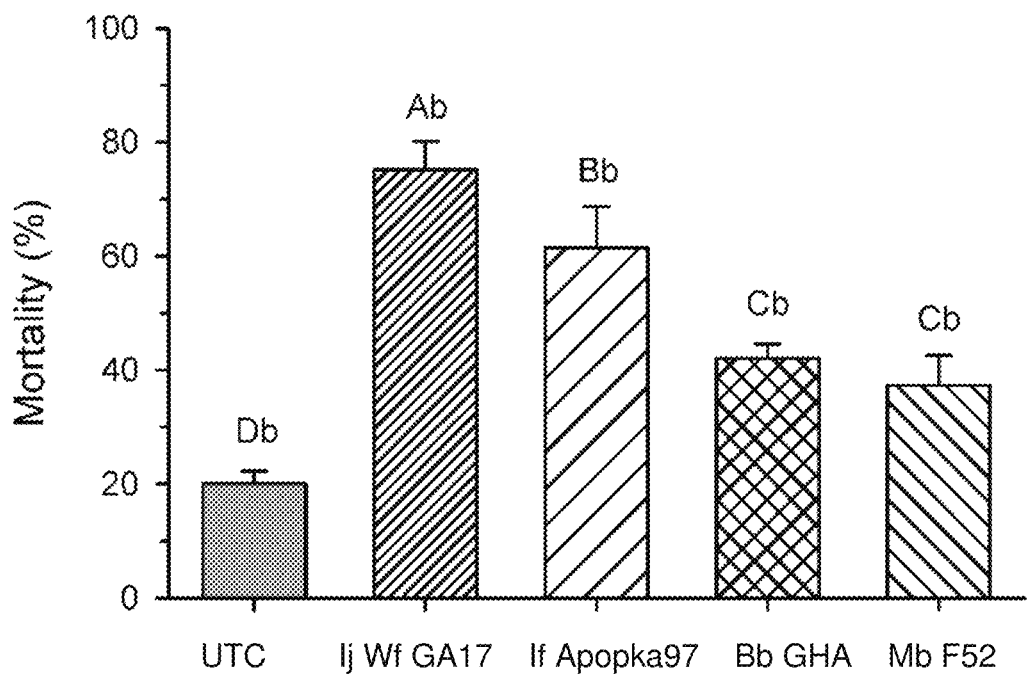
Figure 1C:
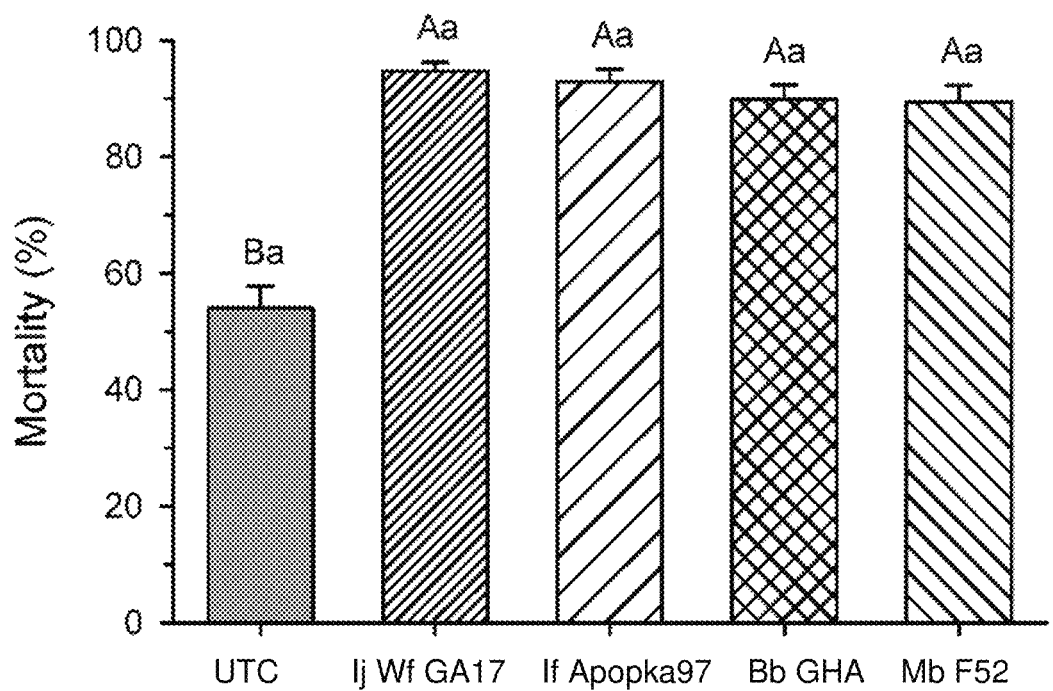

Against *B. tabaci*, both fungal treatment ($F_{4, 74}$=17.14, P<0.0001) and time of exposure ($F_{2, 74}$=650.34, P<0.0001) affected nymphal mortality; there was significant interaction between treatment and time ($F_{8, 74}$=9.19, P<0.0001). The mortality of $4^{th}$ instar *Bemisia tabaci* (biotype B) exposed to various treatments for 3, 5 or 7 days post inoculation (dpi) at 25° C. with a 14:10 photoperiod (L:D) are shown in FIG. 1A to FIG. 1C. Here the percent mortality with each of the fungus is plotted (1=untreated control; 2=*Isaria javanica* strain wf GA17; 3=*Isaria fumosorosea* strain Apopka 97; 4=*Beauveria bassiana* strain GHA; 5=*Metarhizium brunneum* strain F52). As seen in FIG. 1A, at 3 dpi, no differences were detected among treatments. FIG. 1B shows that at 5 dpi all fungi caused significant insect mortality, with *Isaria javanica* strain wf GA17 causing the highest mortality; *Isaria fumosorosea* strain Apopka 97 causing less mortality; *Beauveria bassiana* strain GHA causing even less mortality; and *Metarhizium brunneum* strain F52 having the lowest mortality. As seen at FIG. 1C, at 7 dpi, all fungi had similar levels of mortality, close to 100%. Means with the same capital letters indicate no significant difference among treatments within time period, whereas means with the same lower-case letters indicate no differences within that treatment among time periods (Tukey's test, $\alpha=0.05$).

Figure 2A:
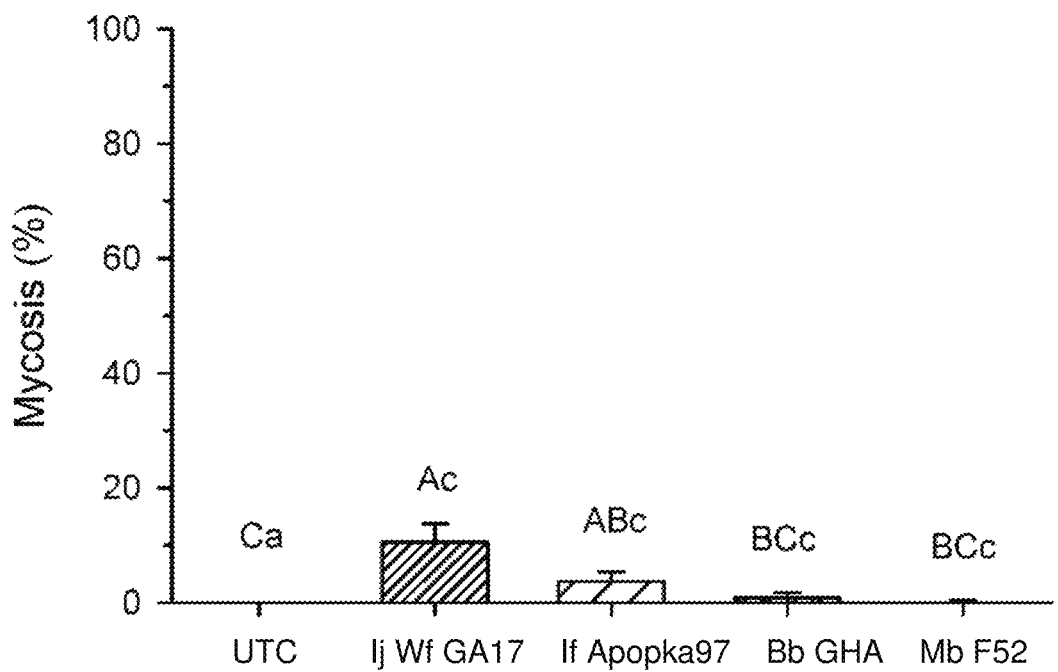
FIG. 2A to FIG. 2C depict graphs of the percentage fungal mycosis development in $4^{th}$ instar *Bemisia tabaci* (biotype B) exposed to various treatments for 3, 5, or 7 days post inoculation (dpi) at 25° C. with a 14:10 photoperiod (L:D).
Figure 2B:
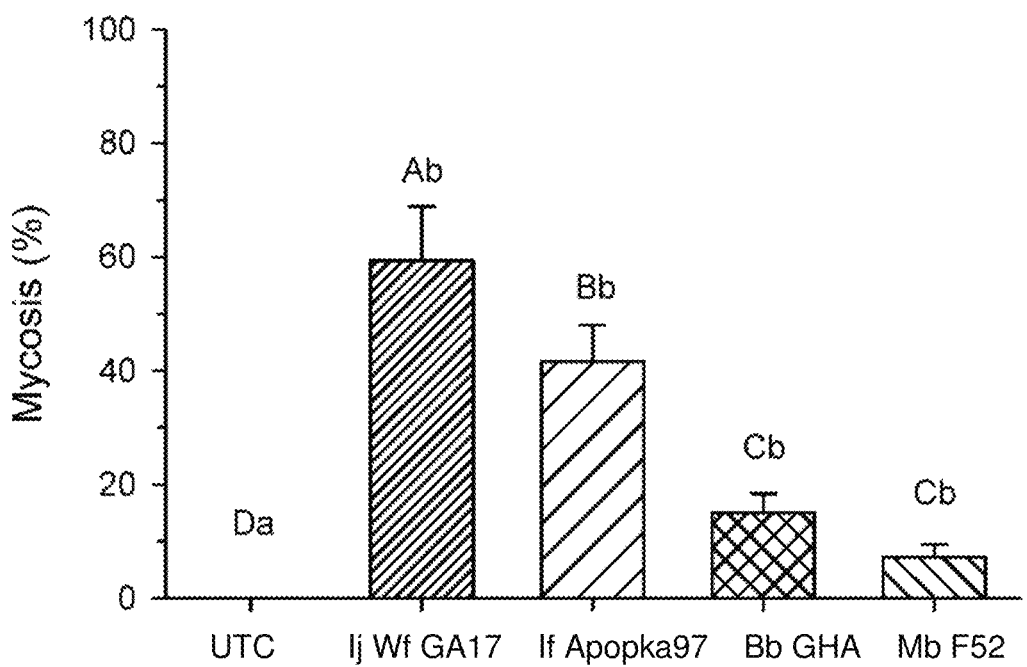
Figure 2C:
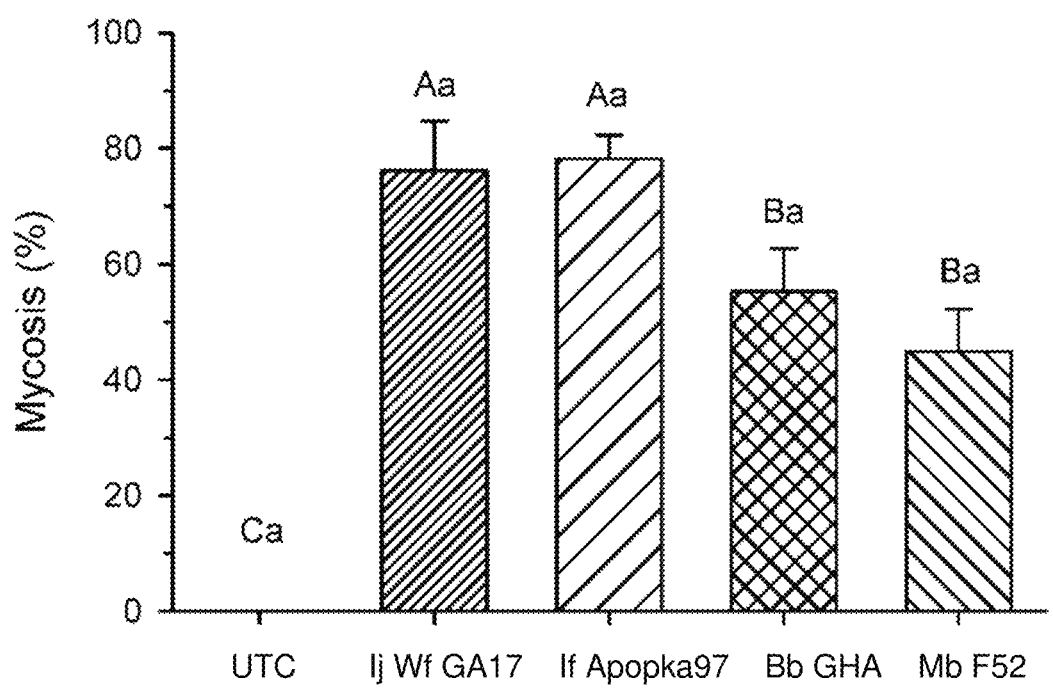

Levels of fungal mycosis development on dead whiteflies were also affected by treatment ($F_{4, 74}=89.69$, $P<0.0001$), time of exposure ($F_{2, 74}=165.73$, $P<0.0001$), and their interactions ($F_{8, 74}=12.51$, $P<0.0001$). The mycosis development of $4^{th}$ instar *Bemisia tabaci* (biotype B) exposed to various treatments (1=untreated control; 2=*Isaria javanica* strain wf GA17; 3=*Isaria fumosorosea* strain Apopka 97; 4=*Beauveria bassiana* strain GHA; 5=*Metarhizium brunneum* strain F52) for 3, 5 or 7 days post inoculation (dpi) at 25° C. with a 14:10 photoperiod (L:D) is shown in FIG. 2A to FIG. 2C. The levels of mycosis development on dead whiteflies were also affected by treatment ($F_{4, 74}=89.69$, $P<0.0001$), time of exposure ($F_{2, 74}=165.73$, $P<0.0001$), and their interactions ($F_{8, 74=12.51}$, $P<0.0001$). The data for 3 dpi is shown in FIG. 2A, which shows that only *Isaria javanica* strain wf GA17 and *Isaria fumosorosea* strain Apopka 97 had measurable mycosis development. The data for 5 dpi is shown in FIG. 2B, which shows a pattern similar to that in mortality, with *Isaria javanica* strain wf GA17 having the highest level of mycosis, *Isaria fumosorosea* strain Apopka 97 presented intermediate levels, and *Beauveria bassiana* strain GHA and *Metarhizium brunneum* strain F52 having the lowest. As seen in FIG. 2C, at 7 dpi, *Isaria javanica* strain wf GA17; and *Isaria fumosorosea* strain Apopka 97 had similar levels of mycosis, which were significantly higher than the mycosis levels of *Beauveria bassiana* strain GHA and *Metarhizium brunneum* strain F52. Mycosis levels increased significantly from 3 to 5 to 7 dpi for all fungal treatments.

Figure 3A:
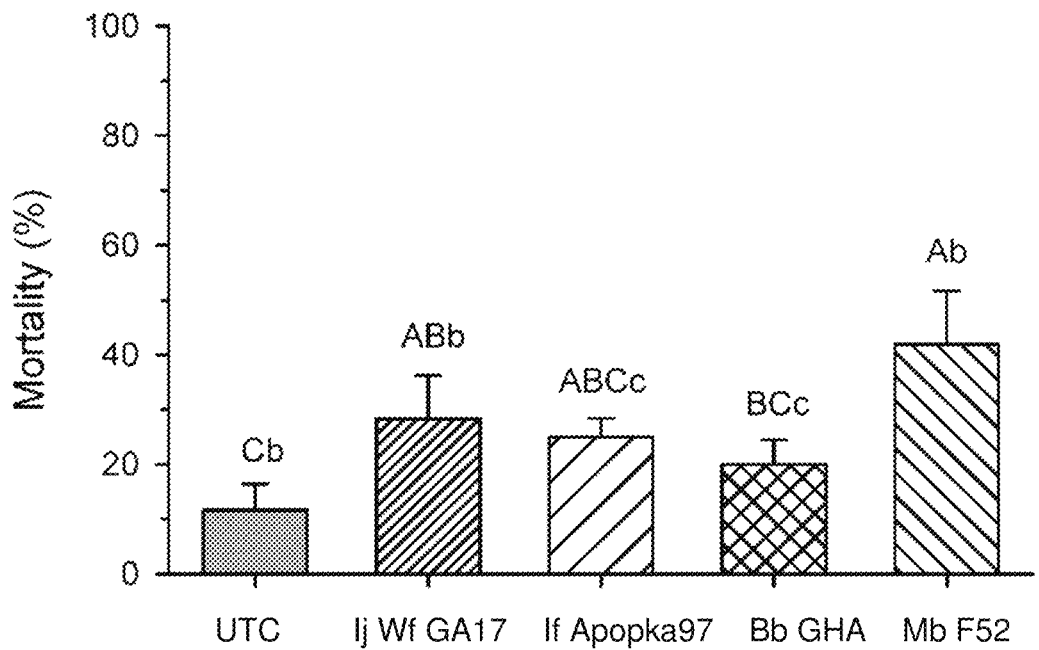
FIG. 3A to 3F depict graphs of the mortality of $4^{th}$ instar *Aphis gossypii* with or without wingbuds, exposed to various treatments for 3, 5, or 7 days post inoculation (dpi) at 25° C. with a 14:10 photoperiod (L:D).
Figure 3B:
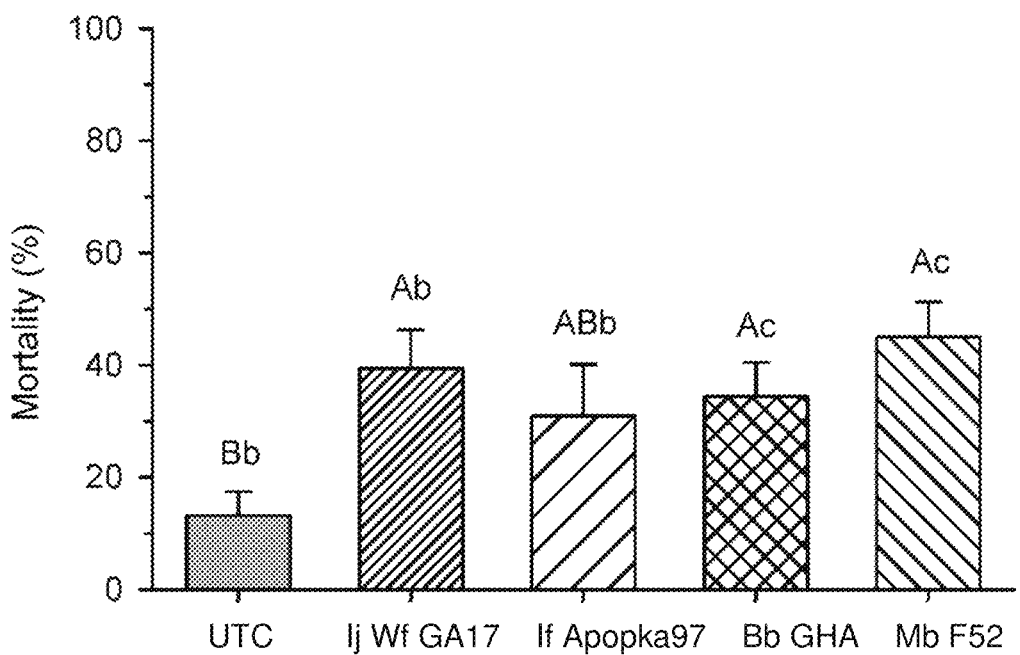
Figure 3C:
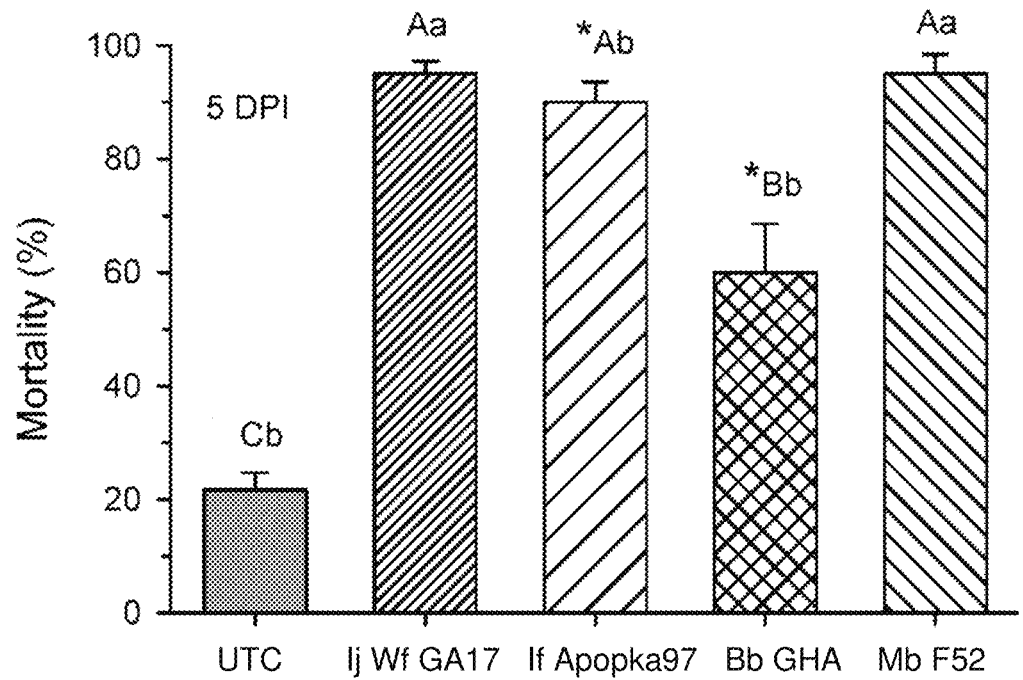
Figure 3D:
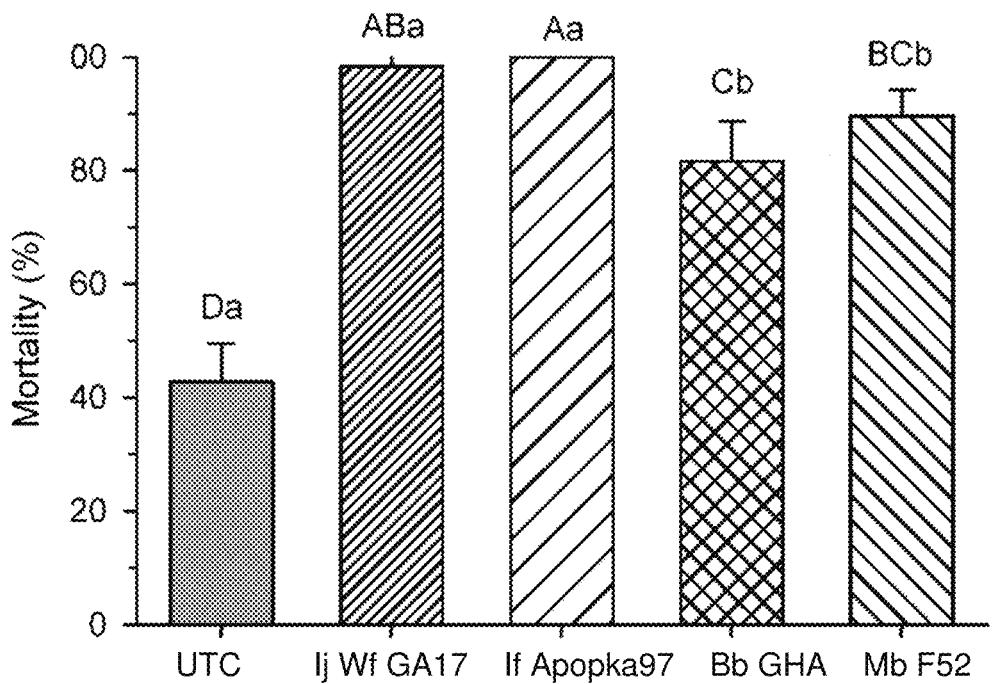
Figure 3E:
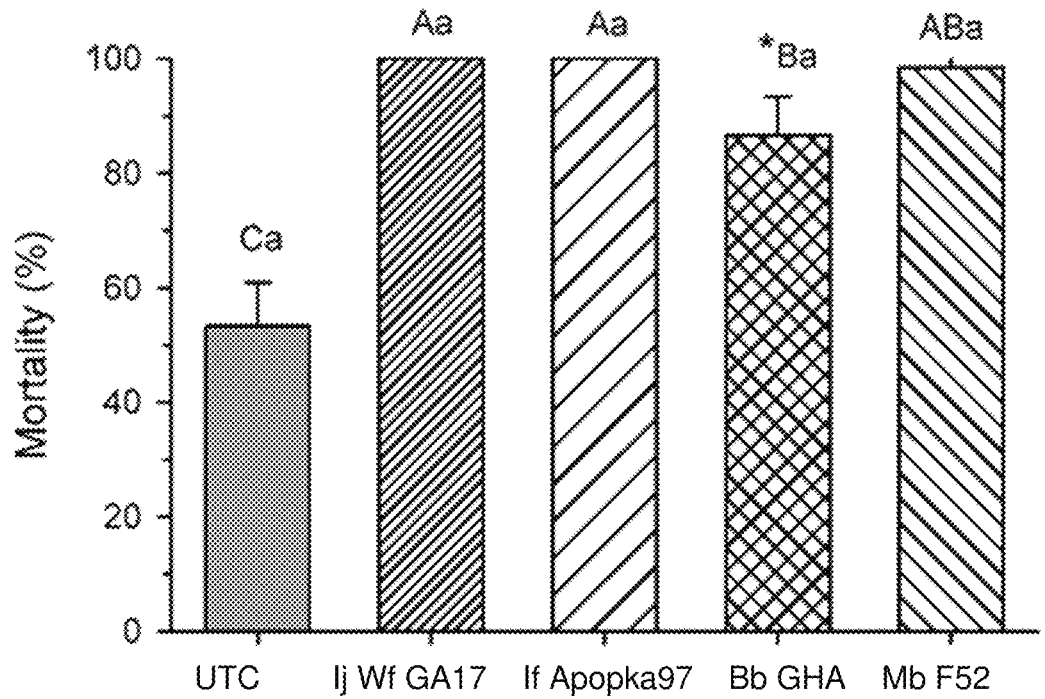
Figure 3F:
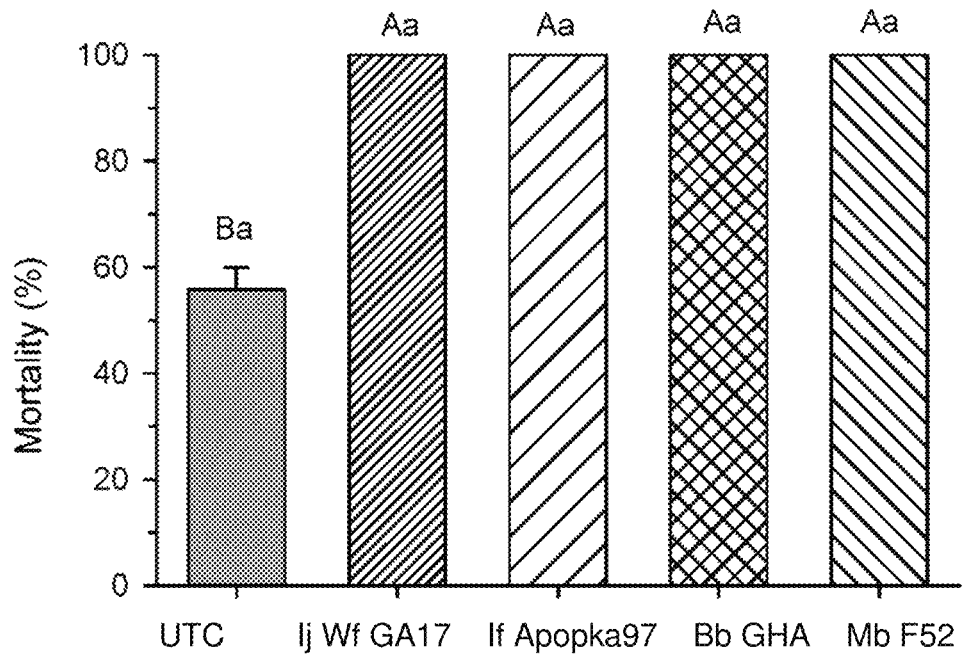

Nymph mortality of *A. gossypii* varied with aphid type (with wingbuds or without wingbuds; $F_{1, 149}=6.12$, $P=0.0082$), treatment ($F_{4, 149}=39.35$, $P<0.0001$), and time ($F_{2, 149}=392.50$, $P<0.0001$). As seen in FIG. 3A to FIG. 3F, among the three factors, only treatment and time had significant interactions ($F_{8, 149}=8.04$, $P<0.0001$). As seen in FIG. 3A, against *A. gossypii* nymphs without wingbuds, at 3 dpi only Mb F52 and Ij wf GA17 caused significant aphid mortality comparing with the untreated control. As seen in FIG. 3C, at or above 5 dpi all fungi caused significant mortality of *A. gossypii* nymphs without wingbuds, and Ij wf GA17, If Apopka 97, and Mb F52 had higher mortality than Bb GHA. As seen in FIG. 3E, no significant difference was observed at 7 dpi between the mortality caused on *A. gossypii* nymphs without wingbuds by Bb GHA and the one caused by Mb F52. As seen in FIG. 3B, against nymphs with wingbuds, at 3 dpi all fungi except If Apopka 97 caused significant mortality. As seen in FIG. 3D, against nymphs with wingbuds, at 5 dpi all fungal treatments exhibited significant mortality, with If Apopka 97 and Ij wf GA17 being most effective. The mortality caused by Bb GHA was lower, but was not different from the mortality caused by Mb F52. As seen at FIG. 3F, against nymphs with wingbuds, at 7 dpi all fungi caused 100% mortality. The type with wingbuds showed higher mortality than the one without wingbuds for If Apopka 97 at 5 dpi, and for Bb GHA at 5 dpi and 7 dpi (Tukey's test).

Figure 4A:
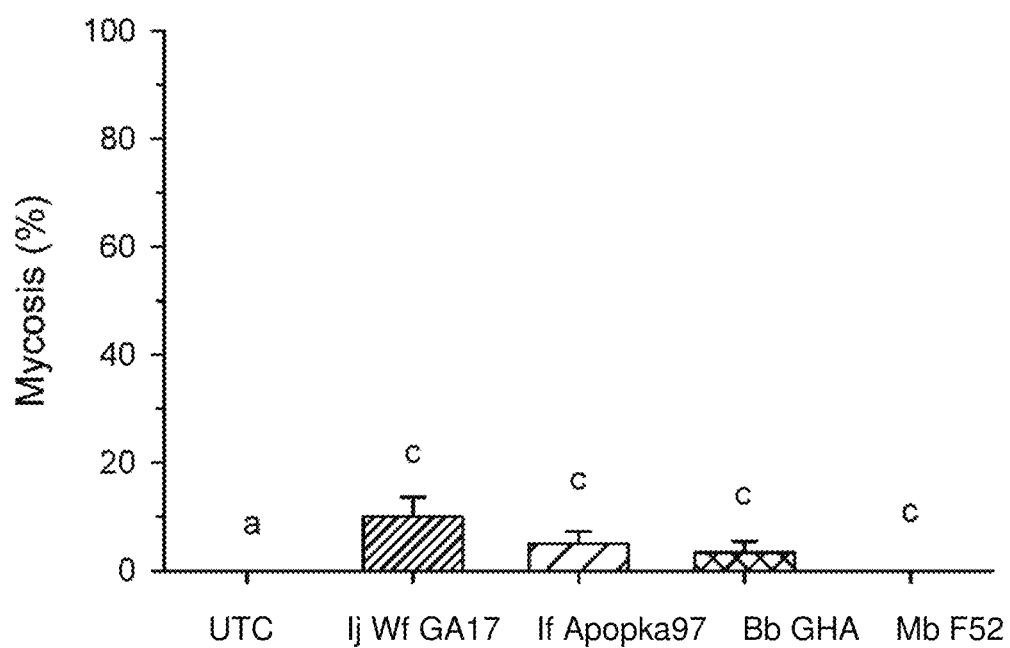
FIG. 4A to FIG. 4F depict graphs of the percentage fungal mycosis development in $4^{th}$ instar *Aphis gossypii* with or without wingbuds exposed to various treatments for 3, 5, or 7 days post inoculation (dpi) at 25° C. with a 14:10 photoperiod (L:D).
Figure 4B:
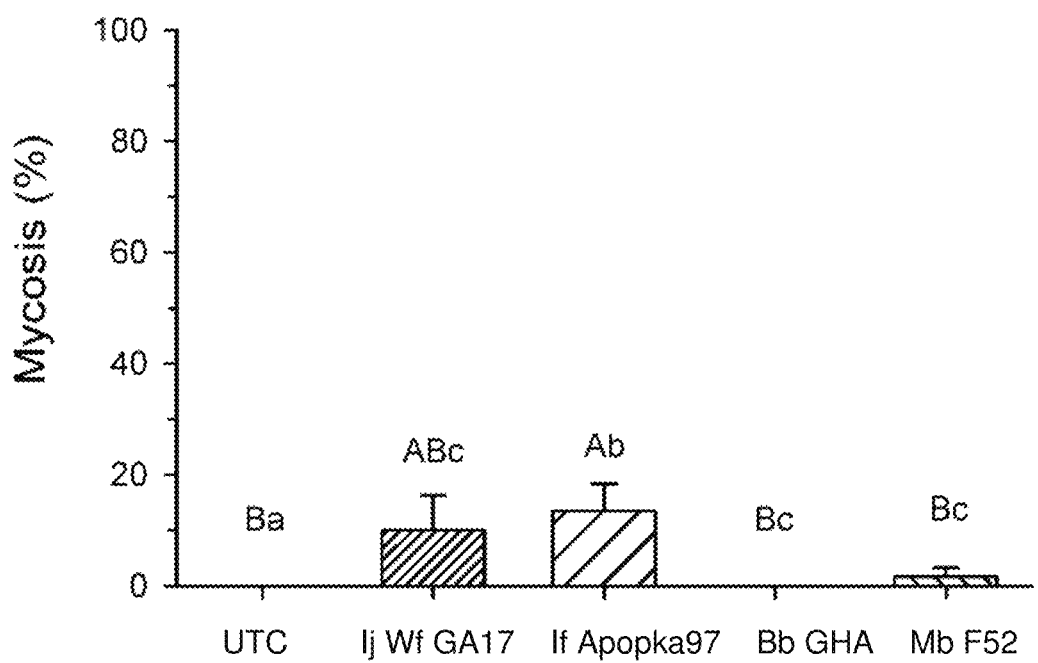
Figure 4C:
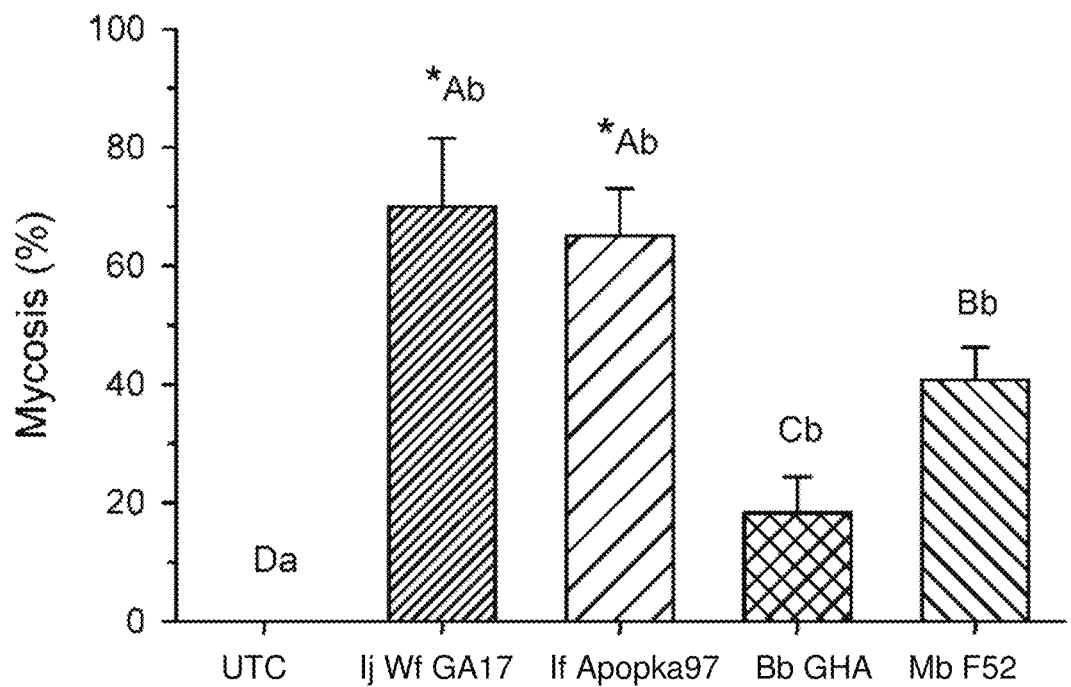
Figure 4D:
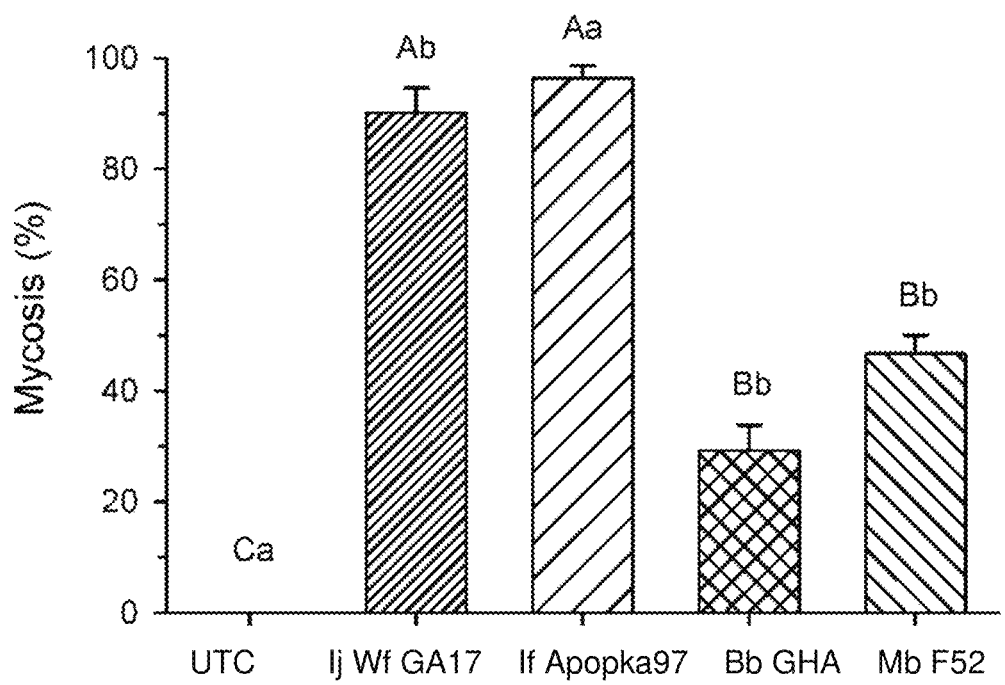
Figure 4E:
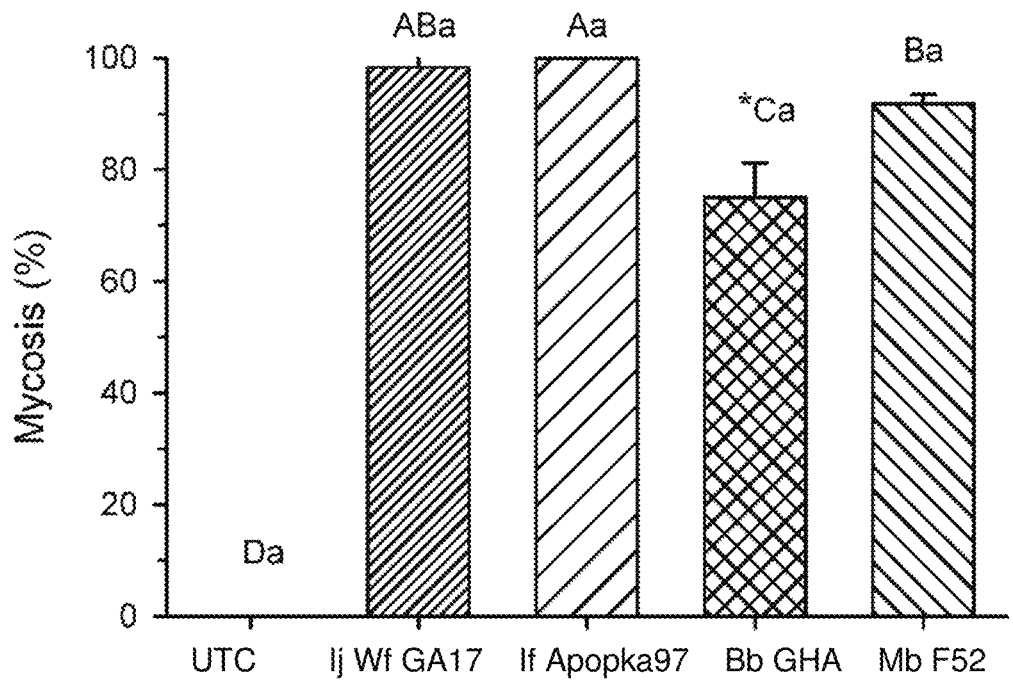
Figure 4F:
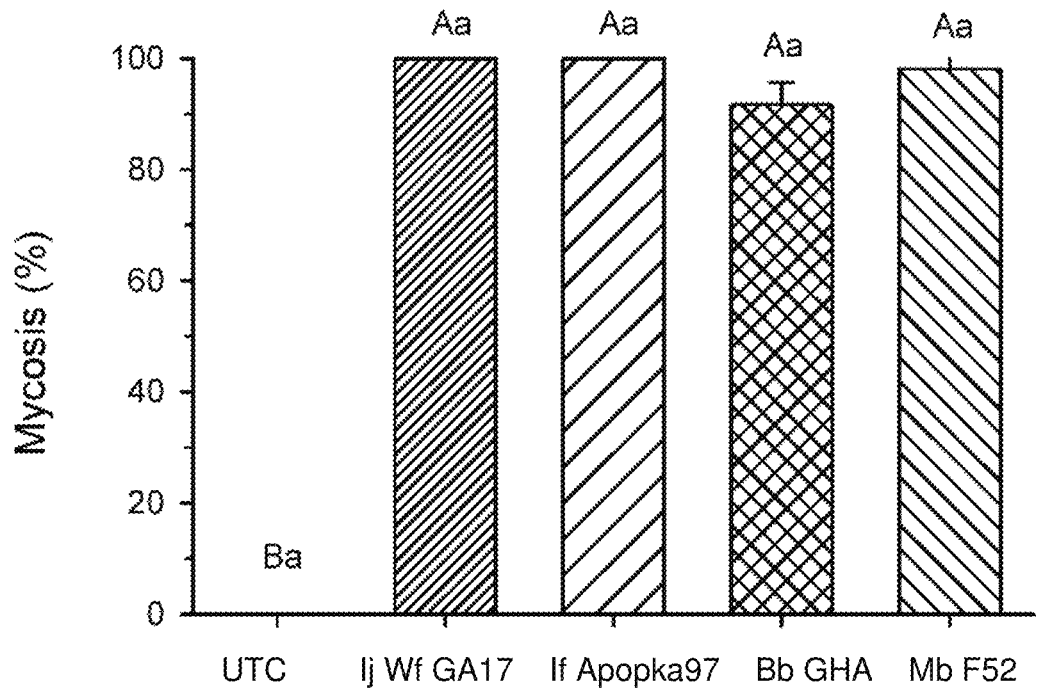

Mycosis development on dead aphids was also significantly affected by aphid type (with or without wingbuds; $F_{1, 149}=7.62$, $P=0.0065$), treatment ($F_{4, 149}=86.76$, $P<0.0001$), and time ($F_{2, 149}=736.92$, $P<0.0001$). FIG. 4A to FIG. 4F depict the percentage fungal mycosis development in $4^{th}$ instar *Aphis gossypii*, with or without wingbuds, exposed to various fungal treatments for 3, 5, or 7 days post inoculation (dpi) at 25° C. with a 14:10 photoperiod (L:D). There were significant interactions between time and aphid type ($F_{2, 149}=6.27$, $P=0.0024$), between time and treatment ($F_{8, 149}=53.80$, $P<0.0001$), and between time, aphid type, and treatment ($F_{8, 149}=3.37$, $P=0.0014$), but not between insect and treatment ($P=0.5312$). Mycosis levels in *A. gossypii* nymphs without wingbuds increased steadily over time for all fungal treatments. As seen in FIG. 4A, against nymphs without wingbuds at 3 dpi, there were no treatment effects due to the overall low level of mycosis development. The results against nymphs without wingbuds at 5 dpi are shown on FIG. 4C, and at 7 dpi are shown on FIG. 4E. These figures show that Ij wf GA17 and If Apopka 97 had equal levels of mycosis development at 5 dpi and 7 dpi. Mycosis development by Ij wf GA17 and If Apopka 97 was the highest, followed by Mb F52, with Bb GHA being the lowest. Mycosis levels in *A. gossypii* nymphs with wingbuds increased significantly from 3 dpi to 5 dpi for all fungal treatments. If Apopka 97, had nearly 100% mycosis at 5 dpi, and mycosis levels for the remaining fungi increased from 5 dpi to 7 dpi. Nymphs with wingbuds were more susceptible to Ij wf GA17 and If Apopka 97 at 5 dpi and to Bb GHA at 7 dpi than the type without wingbuds. As seen on FIG. 4B, at 3 dpi If Apopka 97 had a higher level of mycosis than Bb GHA and Mb F52, but was not different from Ij wf GA17 against nymphs with wingbuds. The results for 5 dpi are shown in FIG. 4D, which shows that at 5 dpi Ij wf GA17 and If Apopka 97 had more mycosis than Bb GHA and Mb F52. As seen on FIG. 4F, at 7 dpi all fungi caused similar levels of mycosis, being close to 100%.

Figure 5A:
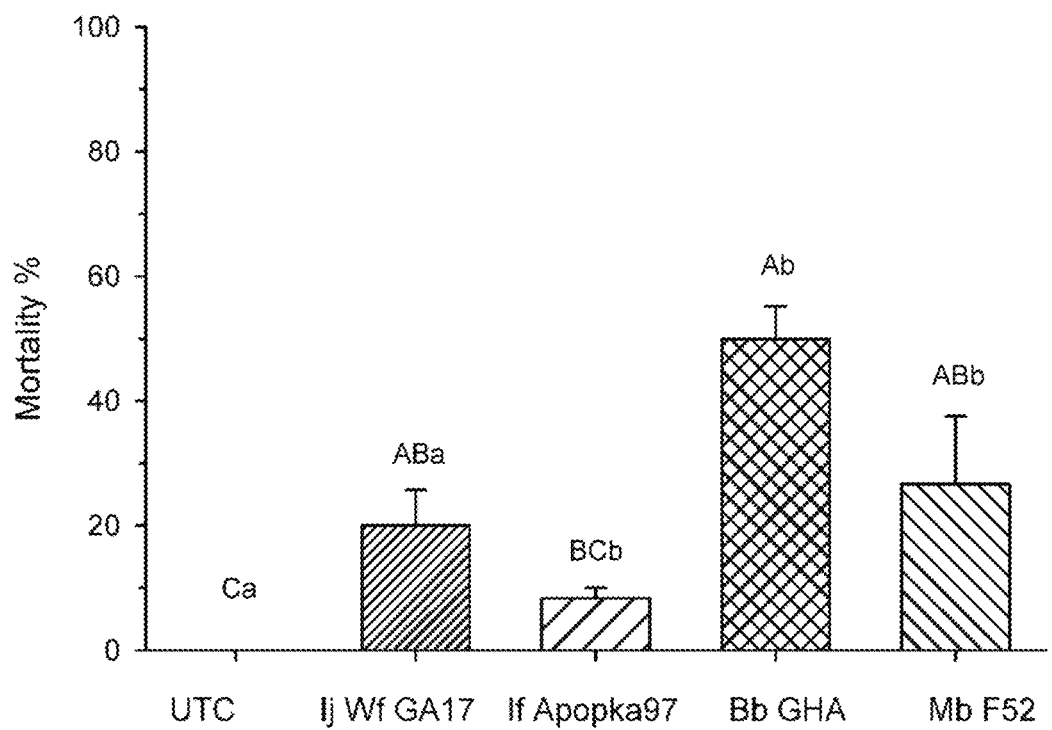
FIG. 5A and FIG. 5B depict graphs of the mortality of last instar *Curculio caryae* exposed to various treatments for 14 or 28 days post inoculation (dpi) at 25° C. with a 14:10 photoperiod (L:D).
Figure 5B:
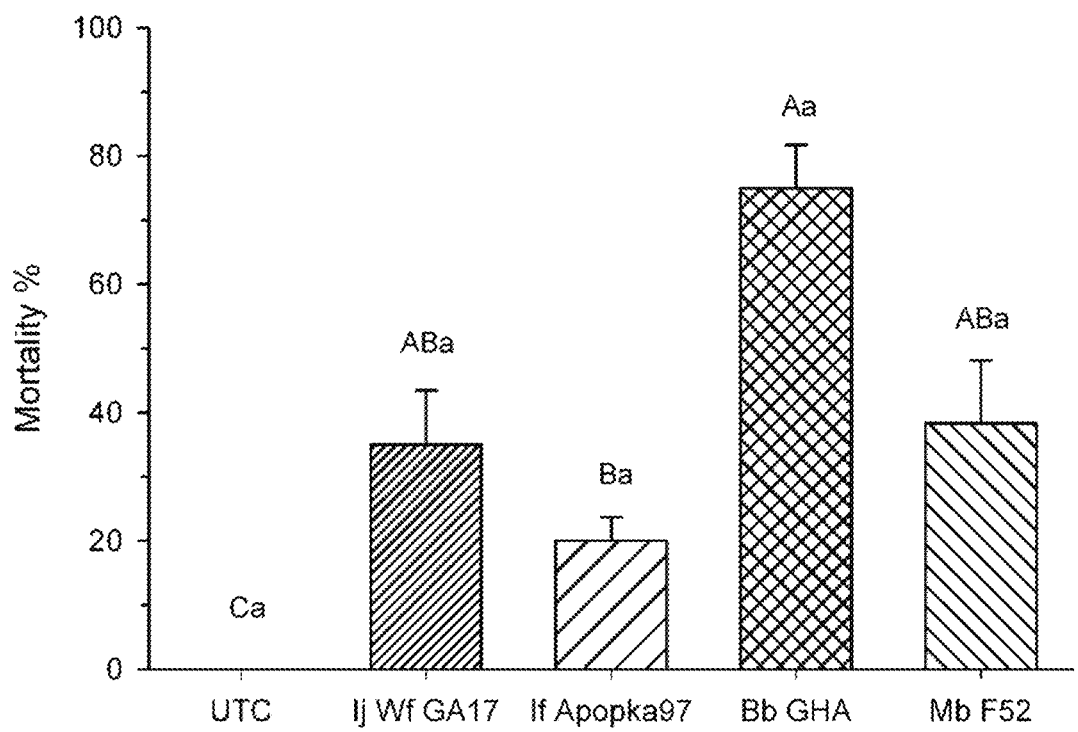

As seen on FIG. 5A and FIG. 5B, in *C. caryae* both, fungal treatment ($F_{4, 49}=5.78$, $P=0.0007$) and time of exposure ($F_{1, 49}=16.58$, $P=0.0002$), had significant effects on larval mortality. Comparison of these two figures shows that there was no significant interaction between treatment and time ($P=0.3684$). As seen in FIG. 5A, at 14 dpi all fungi, except If Apopka 97, caused significant larval mortality compared to the untreated control. As seen in FIG. 5B, all fungi caused significant mortality at 28 dpi ($P\leq0.05$). At both observation times, Bb GHA caused the highest mortality rate, with Ij wf GA17 and Mb F52 causing moderate mortality, If Apopka 97 caused the lowest mortality, which was not significantly different from any of them. Increased mortality from 14 dpi to 28 dpi was observed for all fungi except Ij wf GA17. The development of mycosis on dead insects followed the same pattern as larval mortality, and almost all dead insects showed signs of mycosis.

Figure 6A:
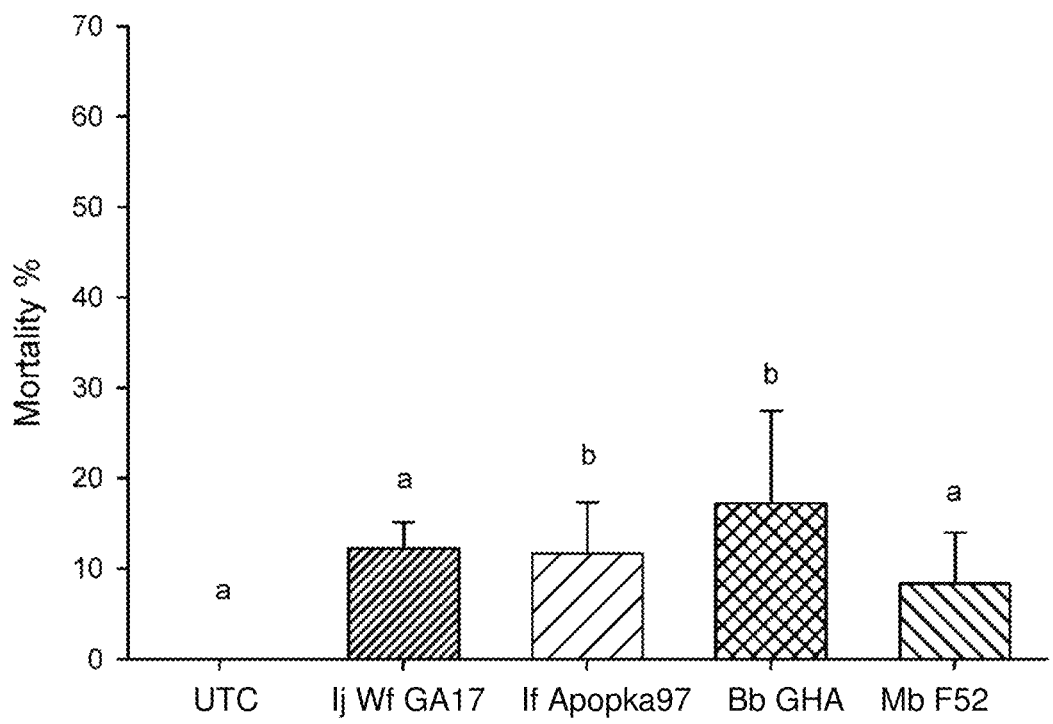
FIG. 6A and FIG. 6B depict graphs of the mortality of last instar *Diaprepes abbreviatus* exposed to various treatments for 14 or 28 days post inoculation (dpi) at 25° C. with a 14:10 photoperiod (L:D).
Figure 6B:
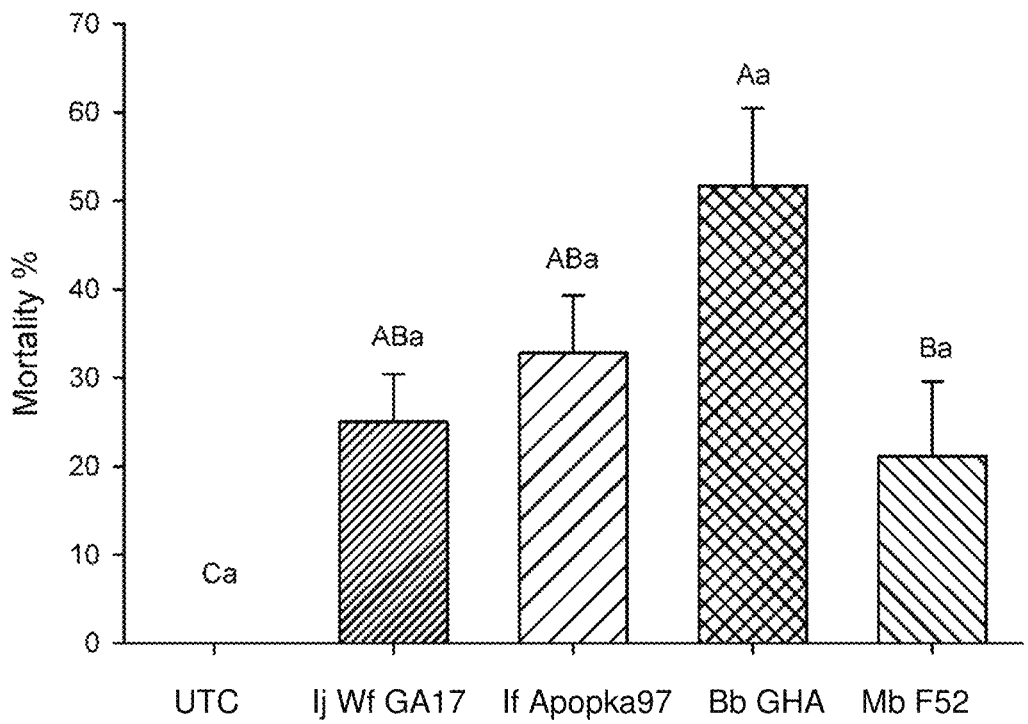

For *D. abbreviatus*, larval mortality was significantly affected by fungus ($F_{4, 49}=3.65$, $P=0.0111$) and time post inoculation ($F_{1, 49}=22.17$, $P<0.0001$), but not by the interaction of fungus and time ($P=0.0888$), as seen on FIG. 6A and FIG. 6B. The results for 14 dpi are depicted on FIG. 6A, which shows that larval mortality was low in general and no fungi caused significant insect mortality (P>0.05). The results for 28 dpi are depicted on FIG. 6B, which shows that all fungi caused significant insect mortality (P 0.05) at this time point. Bb GHA showed the highest mortality, Ij wf GA17 and If Apopka 97 showed intermediate mortality, and Mb F52 showed the least mortality. The mortality caused by the different fungi did not appear to be much different. Mortality increased significantly from 14 dpi to 28 dpi only for If Apopka 97 and Bb GHA. Most dead larvae showed mycosis symptoms, which had a similar trend to larval mortality.

Example 5

EPF Virulence Against *G. Mellonella* Larvae at Environmentally Relevant Temperatures This example shows that at 20° C. and 30° C., in the presence of Ij wf GA17 or If Apopka 97, *G. mellonella* insects had lower mortality than in the presence of Mb F52 or Bb GHA. in the presence of If Apopka 97 and Ij wf GA17 at 25° C. *G. mellonella* insects had a similar mortality, which is lower than that obtained with Mb F52 or Bb GHA.

The four fungal strains were tested against *G. mellonella* under a broad range of environmentally relevant temperatures (10° C., 15° C., 20° C., 25° C., 30° C., and 35° C.). There were five treatments per temperature: four fungi plus one untreated control. Each treatment was conducted in three replicates, with 10 insects per replicate. The fungi were applied in 1 ml of $10^6$ viable conidia/ml to 30-ml soil cups. The cups were filled with 10 g of autoclaved soil and 0.4 ml of distilled water that resulted in a 14% soil moisture content (volume by weight). The untreated control received 1 ml of 0.05% SILWET L-77 organosilicone surfactant for use in agriculture, and 0.4 ml distilled water only. After application, a single last instar *G. mellonella* was added to each cup. Each cup was then covered with a tight fitting lid and placed on a tray. Trays were bagged with wet paper towels included to maintain moisture before being placed in growth chambers maintaining at 14:10 (L:D) photoperiod and randomly assigned to a given temperature. Percentage insect mortality and signs of mycosis (fungal growth on the cadavers) were recorded at 7 and 14 days post inoculation (dpi) following Shapiro-Ilan D. et al. (2008, "Virulence of Hypocreales fungi to pecan aphids (Hemiptera: Aphididae) in the laboratory," J. Invertebr. Pathol. 99: 312-317). Briefly, dead insects were incubated for one week to observe signs of fungal infection. Mycosis was confirmed if morphology of fungal outgrowth and sporulation on cadaver followed the same pattern of infection by a given fungus. The entire experiment was repeated three times.

Figure 7A:
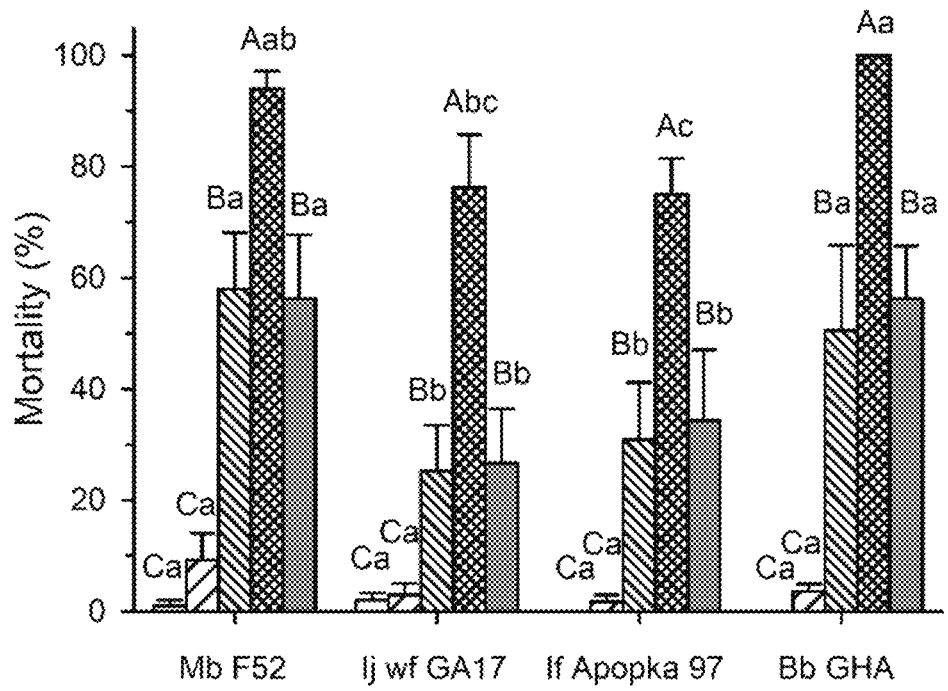
FIG. 7A to FIG. 7D depict graphs of the mortality and mycosis of *Galleria mellonella* larvae exposed to various fungal treatments at various temperatures at 7 and 14 days post inoculation (dpi) in soil cups.
Figure 7B:
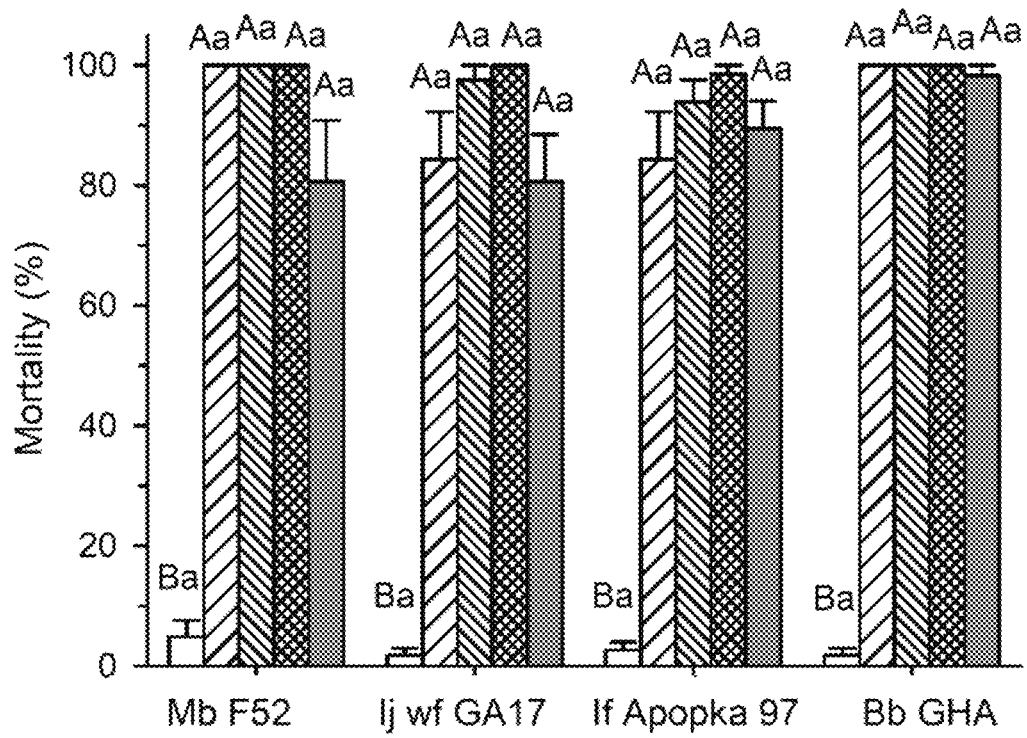

Virulence ranged widely by temperature. At 35° C., control mortality was high (30% at 7 dpi and 93% at 14 dpi), and no mycosis was observed in any of the fungal treatments. As shown in FIG. 7A, insect mortality was significantly affected by both temperature ($F_{4,158}$=50.75, P<0.0001) and fungal strain ($F_{3,158=9.90}$, P<0.0001), and there was no significant interaction between temperature and fungus ($F_{12,158}$=1.39, P=0.1761) at 7 dpi. At both 20° C. and 30° C., in the presence of Ij wf GA17 or If Apopka 97 insects had lower mortality than in the presence of Mb F52 or Bb GHA. At 25° C., in the presence of Bb GHA insects had about 100% mortality, in the presence of Mb F52 insects had a slightly lower mortality, and in the presence of If Apopka 97 and Ij wf GA17 insects had an even lower mortality, and about the same. As seen in FIG. 7B, at 14 dpi, only temperature had significant effect on insect mortality ($F_{4,158}$=69.67, P<0.0001); fungal strains did not affect mortality ($F_{3,138=1.02}$, P=0.3838), and there was no significant interaction between the two factors ($F_{12,158}$=0.29, P=0.9906).

Figure 7C:
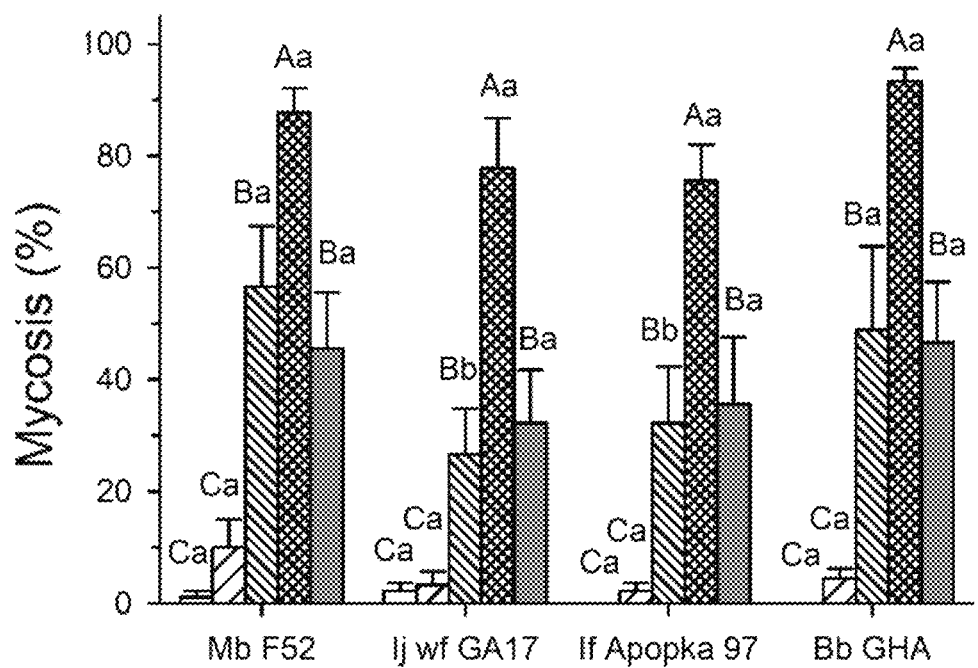
Figure 7D:
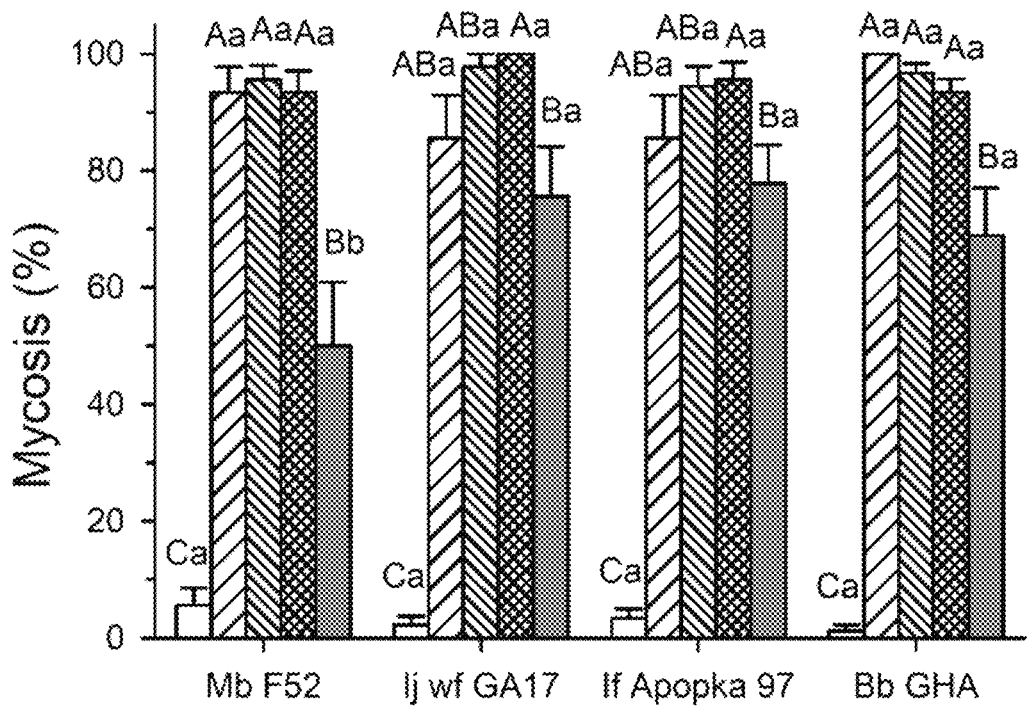

Most insects that died at 7 dpi and 14 dpi showed signs of mycosis. As seen on FIG. 7C, at 7 dpi, temperature had a significant effect on mycosis levels for each fungal species ($F_{4,158}$=53.30, P<0.0001). Fungal strain only had an effect at 20° C., in which Ij wf GA17 and If Apopka 97 showed lower mycosis than Mb F52 and Bb GHA ($F_{3,158}$=2.67, P=0.0496). There was no interaction between fungus and temperature ($F_{12,158}$=0.60, P=0.8410). Mycosis development followed a similar trend as mortality. At 7 dpi all the fungus had the highest mycosis at 25° C., with 20° C. and 30° C. having lower but similar effects. Very low mycosis occurred with all fungus at 10° C. and 15° C. As seen on FIG. 7D, at 14 dpi, mycosis levels were significantly affected by temperature ($F_{4,158}$=66.91, P<0.0001) but not by fungus ($F_{3,158}$=1.81, P=0.1478); there was a significant interaction ($F_{12,158}$=2.04, P=0.024). Ij wf GA17 and If Apopka 97 showed the same pattern, with the highest mycosis occurring at 25° C. Mycosis at 15° C. and 20° C. were not different from the mycosis values obtained for either 25° C. or 30° C. However, in Mb F52 and Bb GHA, similar mycosis levels occurred at 15° C. and 25° C., these levels of mycosis were significantly higher than those seen at 30° C. for these two fungi.

All fungal strains showed high levels of insect mortality at 15° C. to 30° C., whereas less than 5% insect mortality was observed at 10° C. Comparing fungal strains, all caused similarly low mycosis at 10° C. and similarly high levels between 15° C. and 25° C., but Mb F52 caused lower mycosis than other fungi at 30° C.

Example 6

Effect of Temperature Extremes

After exposure of fungi to 35° C. or 40° C., germination after 16 hour incubation at 25° C. was lower for Ij wf GA17 and If Apopka 97 than for Mb F52 and Bb GHA, with Ij wf GA17 germination being slightly higher than that of If Apopka 97. Decline in mortality and mycosis development followed a similar pattern after exposure of the fungi to 35° C. or 40° C.

Spore viability and virulence of the four EPF species were tested at low (−20° C.) and high (35° C. and 40° C.) temperatures. These temperatures were chosen because they may affect fungal viability in storage, transportation, and field persistence. The −20° C. replicates were exposed in a laboratory freezer, while the 35° C. and 40° C. replicates were tested in water baths, which were calibrated prior to treatment and monitored during the experiment. At −20° C., both spore viability and virulence were observed at 0 and 56 days after treatment. At 35° C., spore viability was evaluated at 0, 2, 4, 8, 12, 24, 48, and 72 hours of heat treatment; and fungal virulence was checked at 0, 12, 24, and 48 hours. At 40° C., spore viability was observed at 0, 0.5, 1, 2, 3, 4, 6, and 8 hours; and virulence was determined at 0, 1, 2, and 4 hours. Tests were conducted by placing a 1.5 ml spore suspension ($10^6$ viable spores/ml) in a 2-ml sterile NALGENE cryogenic vial (Thermo Scientific) that was subsequently exposed to specified temperature treatments for different lengths of time. After treatment, the vial was vortexed for 1 minute before taking samples to check spore viability and virulence. A 0.1 ml aliquot was spread over PDA in a 60 mm Petri dish, with 1% yeast extract, and incubated at 25° C. for 16 hours and 40 hours to score the germination rate; two germination dishes were prepared for each replicate. The virulence of fungal spores after heat treatment was tested in Petri dishes, and an untreated control was used in parallel. An aliquot of 0.1 ml spore suspension was applied to a 35-mm Petri dish lined with a single layer of sterile filter paper (30-mm, Whatman No. 1), and one last instar G. mellonella larvae was added after application. The untreated control received 0.1 ml sterile 0.05% SILWET L-77 organosilicone surfactant for use in agriculture, and the insect only. There were three replicates of 10 dishes per treatment. After treatment the dishes were arranged in trays and placed in growth chamber maintaining 25° C. (L:D 14:10). Insect mortality and mycosis were evaluated at 7 and 14 dpi. The entire experiment was repeated twice.

Figure 8A:
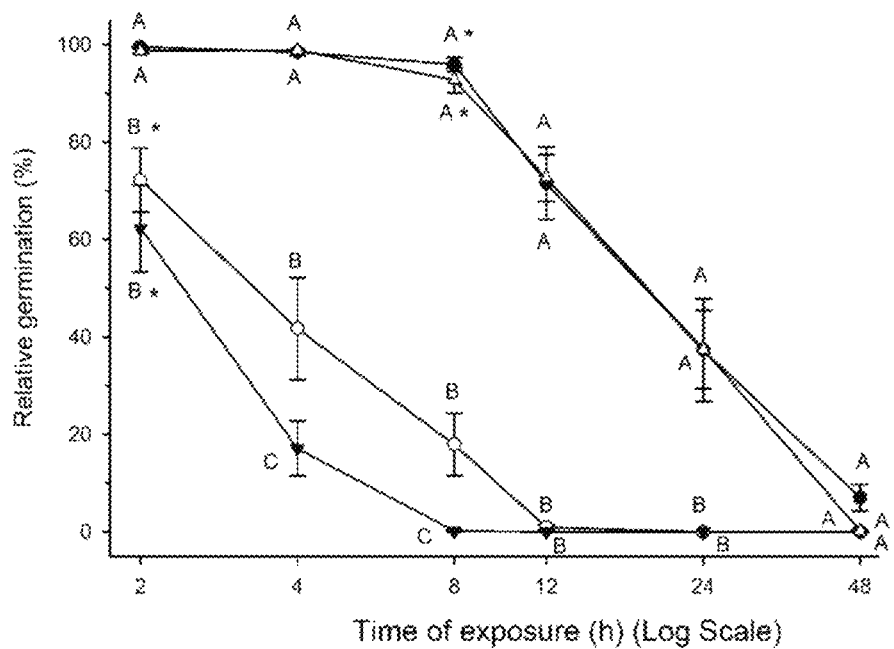
FIG. 8A and FIG. 8B depict graphs of the relative germination of fungi after 16 hour incubation at 25° C. following exposure to higher temperatures for various lengths of time.

At 35° C., spore viability before treatment was at or above 95% for all fungi. The relative germination after 16 hour incubation at 25° C. of fungi after exposure to 35° C. for various lengths of time is shown in FIG. 8A. Spore germination varied significantly due to both, time of heat exposure ($F_{6,305}=106.32$, $P<0.0001$) and fungal strain ($F_{3,305}=140.21$, $P<0.0001$); which had significant interactions ($F_{18,305}=12.89$, $P<0.0001$). A significant decline in 16-hour germination appeared starting after 8-hour heat treatment for Mb F52 and Bb GHA, and after 2-hour heat treatment for Ij wf GA17 and If Apopka 97. The germination rate of Mb F52 and Bb GHA was similar in all observations, which were significantly higher than those for Ij wf GA17 and If Apopka 97 at all times except 48 hours (due to an overall low germination in all fungi). Ij wf GA17 had a higher germination rate than If Apopka 97 after 4 hours and 8 hours of heat treatment. The half-time at 35° C. for 16-hour germination ($GT_{50}$) was 26.28 hours (95% fiducial limit (F.L.): 25.74-26.83 hours) for Mb F52; 4.34 hours (95% F.L.: 4.22-4.46 hours) for Ij wf GA17; 2.72 hours (95% F.L.: 2.66-2.78 hours) for If Apopka 97; and 19.49 hours (95% F.L.: 19.14-19.84 hours) for Bb GHA. In addition, Mb F52, Ij wf GA17, If Apopka 97, and Bb GHA had delayed germination after 40 hours incubation by 72-hour heat treatment (10.6 t 6.3%), 24-hour (1.2±0.5%), 12-hour (0.7±0.4%), and 48-hour treatment at 35° C. (3.5±1.1%), respectively, which also followed the same pattern as 16 hour germination. Thus, if an extended time-period of incubation was allowed, some germination was observed albeit in a delayed manner. This suggests that Mb F52 had the highest thermo-tolerance, followed by Bb GHA, then Ij wf GA17, and If Apopka 97 had the lowest tolerance at 35° C.

Figure 8B:
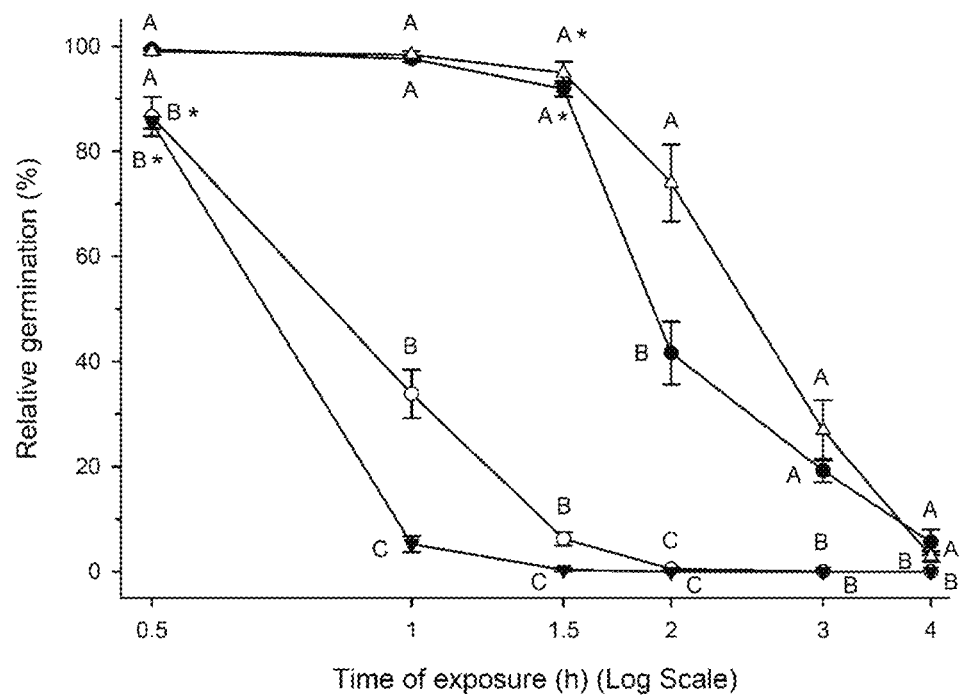

Spore viability before treatment at 40° C. was higher than 98% for all fungi. The relative germination after 16 hour incubation at 25° C. of fungi after exposure to 40° C. for various lengths of time is shown in FIG. 8B. Similar to the results obtained for 35° C. both, time of heat treatment ($F_{6,139}=185.42$, $P<0.0001$) and fungi ($F_{3,139}=189.83$, $P<0.0001$), affected 16-hour germination, and had significant interactions ($F_{18,139}=16.27$, $P<0.0001$). A significant decline in 16-hour germination occurred starting at 1.5 hours of 40° C. heat treatment for Mb F52 and Bb GHA, and at 0.5 hour of 40° C. heat treatment for Ij wf GA17 and If Apopka 97. The trend followed a similar pattern as that seen for heating at 35° C.: Mb F52 and Bb GHA had a higher germination than Ij wf GA17 and If Apopka 97 in general, and Ij wf GA17 had higher germination than If Apopka 97 at the 1 hour 40° C. heat treatment, and the 1.5 hour 40° C. heat treatment; however, Bb GHA had a higher 16-hour germination than Mb F52 after exposure to 40° C. for 2 hours. The half time at 40° C. for 16-hour germination ($GT_{50}$) was 2.24 hours (95% F.L.: 2.20-2.27 hours) for Mb F52; 0.91 hours (95% F.L.: 0.89-0.93 hours) for Ij wf GA17; 0.70 hours (95% F.L.: 0.69-0.72 hours) for If Apopka 97; and 2.52 hours (95% F.L.: 2.48-2.56 hours) for Bb GHA. In addition, delayed germination at 40 hours was observed in Mb F52, Ij wf GA17, If Apopka 97, and Bb GHA by 8 hours (12.3±2.3%), 4 hours (0.3±0.2%), 2 hours (0.3±0.3%), 8 hours (0.9±0.5%), respectively. This suggests similarly high thermo-tolerance of Bb GHA and Mb F52 at 40° C., followed by Ij wf GA17, and If Apopka 97 still had the lowest tolerance. Similar to 35° C., thermo-tolerance of Ij wf GA17 at 40° C. was higher than If Apopka 97, despite lower than Bb GHA and Mb F52.

Figure 9A:
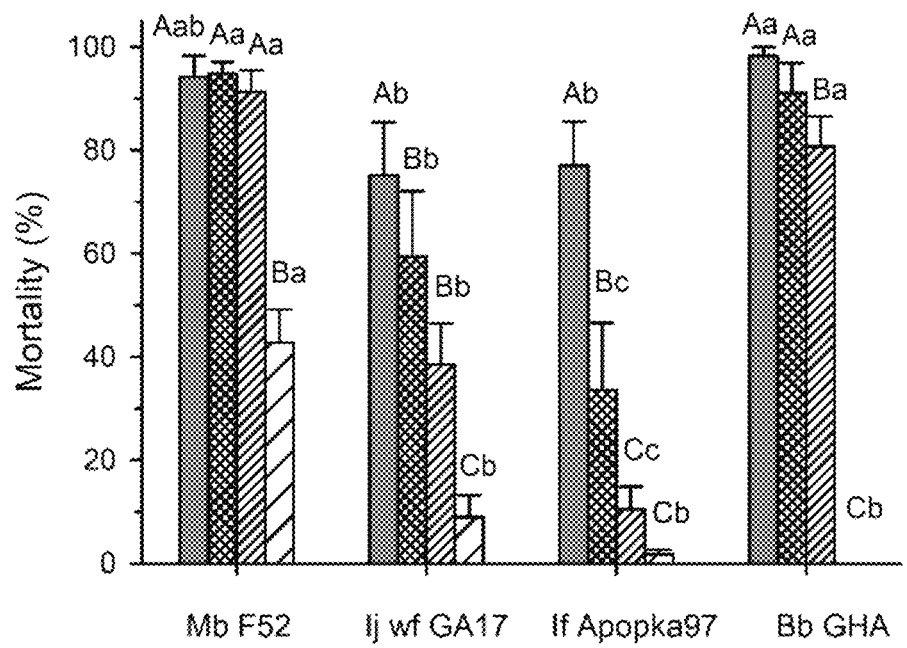
FIG. 9A to FIG. 9D depict graphs of the mortality and mycosis of *Galleria mellonella* larvae exposed to various fungi which had been treated with 35° C. temperature for 0, 12, 24, and 48 hours, at 7 and 14 days post inoculation (dpi).
Figure 9B:
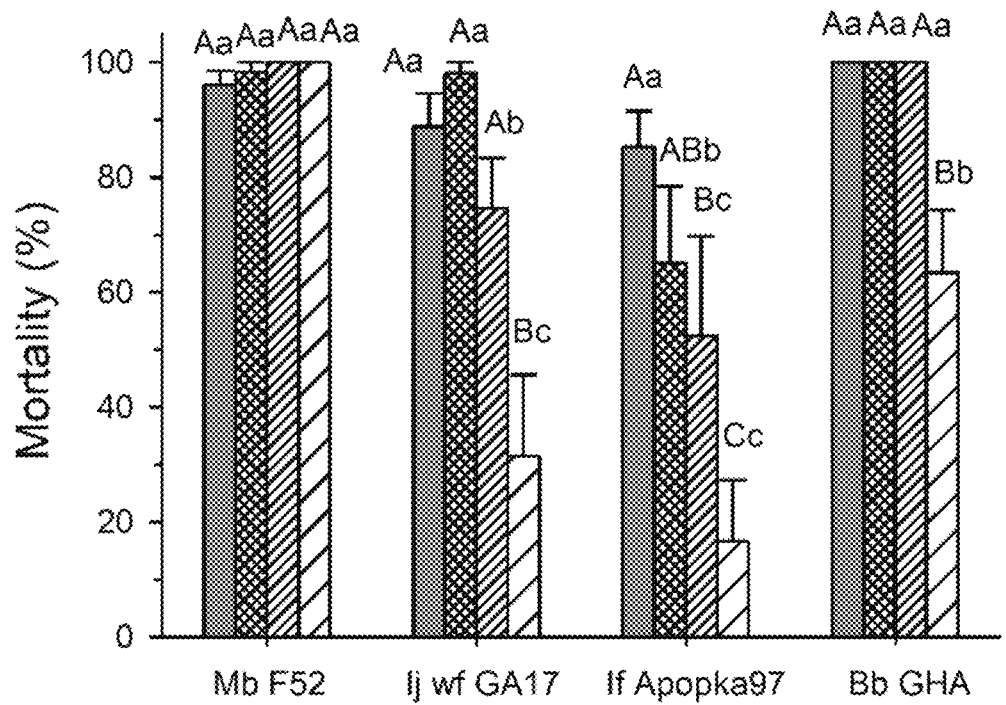
Figure 9C:
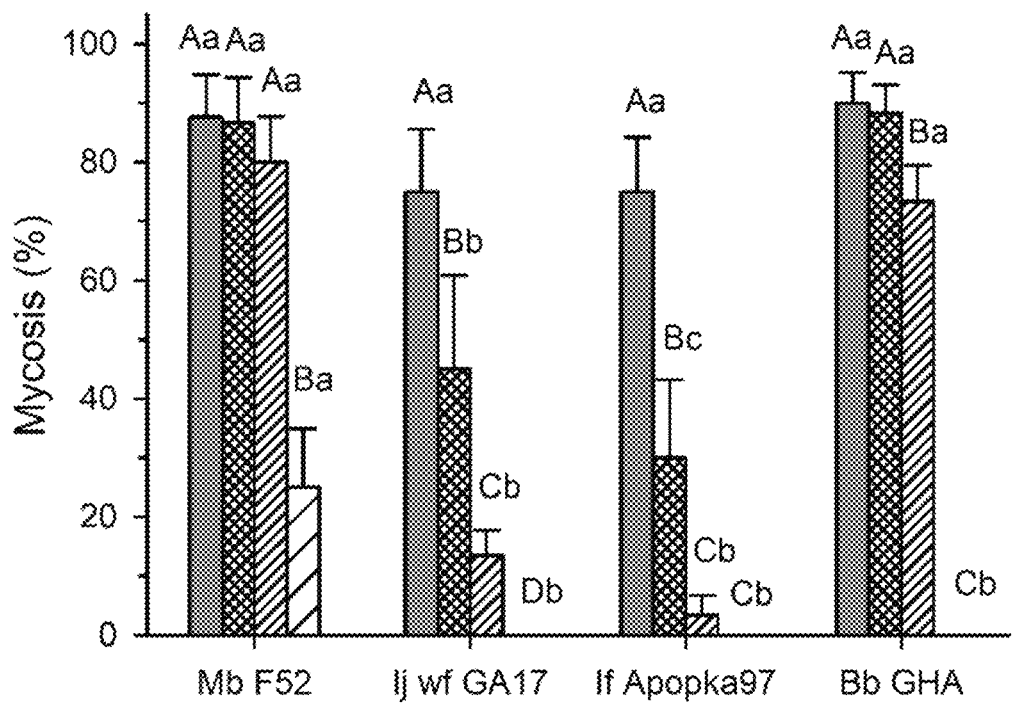
Figure 9D:
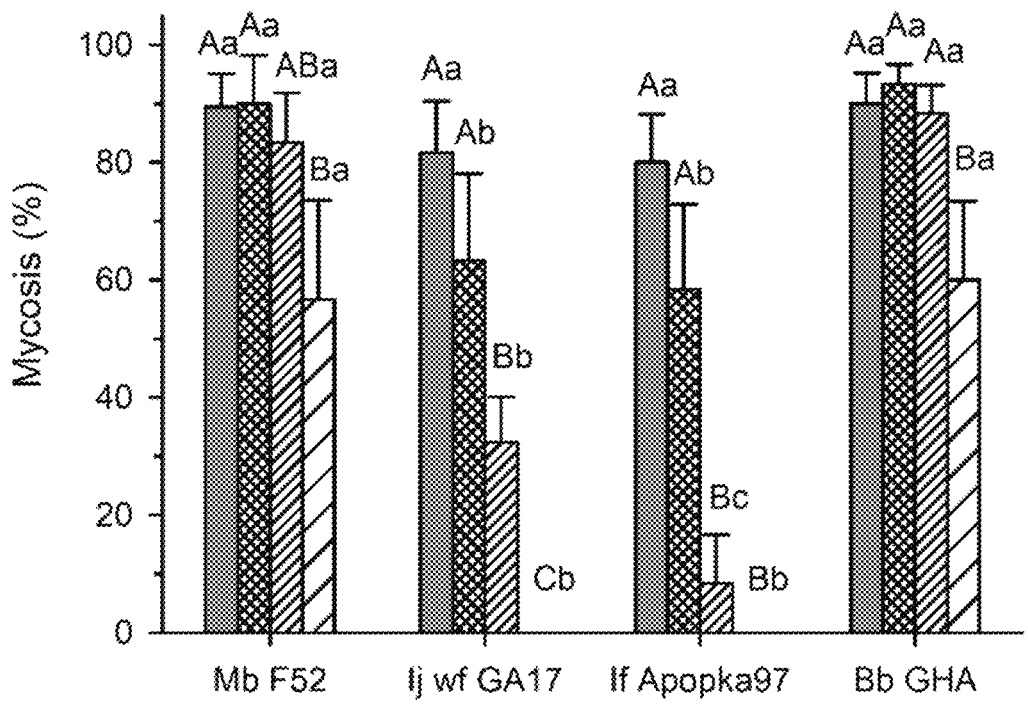

Treatment at 35° C. also affected the fungal virulence, varying with time of heat treatment ($F_{3,79} \geq 15.26$, $P<0.0001$) and fungal strains ($F_{3,79 \geq 14.94}$, $P<0.0001$), in causing both insect mortality and mycosis at both 7 dpi and 14 dpi. There were significant interactions between heat treatment and fungal strains ($F_{9,79} \geq 3.26$, $P \leq 0.002$). As seen in FIG. 9A, at 7 dpi, decline in mortality started after 48 hours of 35° C. heat treatment for Mb F52 and Bb GHA, while the decline in mortality started after 12 hours of 35° C. heat treatment for Ij wf GA17 and If Apopka 97. As seen on FIG. 9C, mycosis development followed a very similar pattern. As seen on FIG. 9A, at 7 dpi, after heating for 12 hours and 24 hours at 35° C., Ij wf GA17 caused higher mortality than If Apopka 97. As seen on FIG. 9D, at 7 dpi, after heating for 12 hours at 35° C., Ij wf GA17 had higher mycosis, but this mycosis was lower than presented by Mb F52 and Bb GHA. As seen on FIG. 9B, at 14 dpi, insect mortality was similarly high within 48 hour heat treatment to Mb F52, while a decline in mortality occurred at 48 hour heat treatment to Ij wf GA17 and Bb GHA, and started at 24 hour heat treatment to If Apopka 97. As seen on FIG. 9D, mycosis had a similar trend to mortality at 14 dpi, except that reduced levels appeared after 48 hours at 35° C. for Mb F52, and at 24 hours for both Ij wf GA17 and If Apopka 97. At 14 dpi, again Ij wf GA17 caused higher mortality than If Apopka 97 at 12 hours and 24 hours but higher mycosis at 24 hours, and was lower than Mb F52 and Bb GHA except mortality after 12 hour heat exposure. No mycosis occurred in Ij wf GA17 or If Apopka 97 after 48 hour heat treatment at 35° C.

Figure 10A:
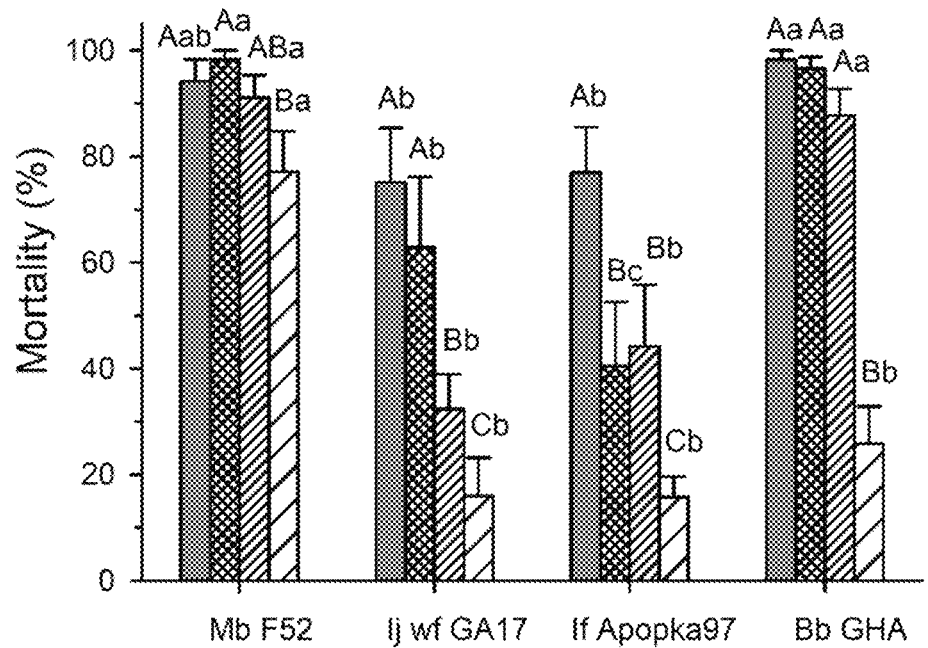
FIG. 10A to FIG. 10D depict graphs of the mortality and mycosis of *Galleria mellonella* larvae exposed to various fungi which had been treated with 40° C. for 0, 1, 2, and 4 hours, at 7 and 14 days post inoculation (dpi).
Figure 10B:
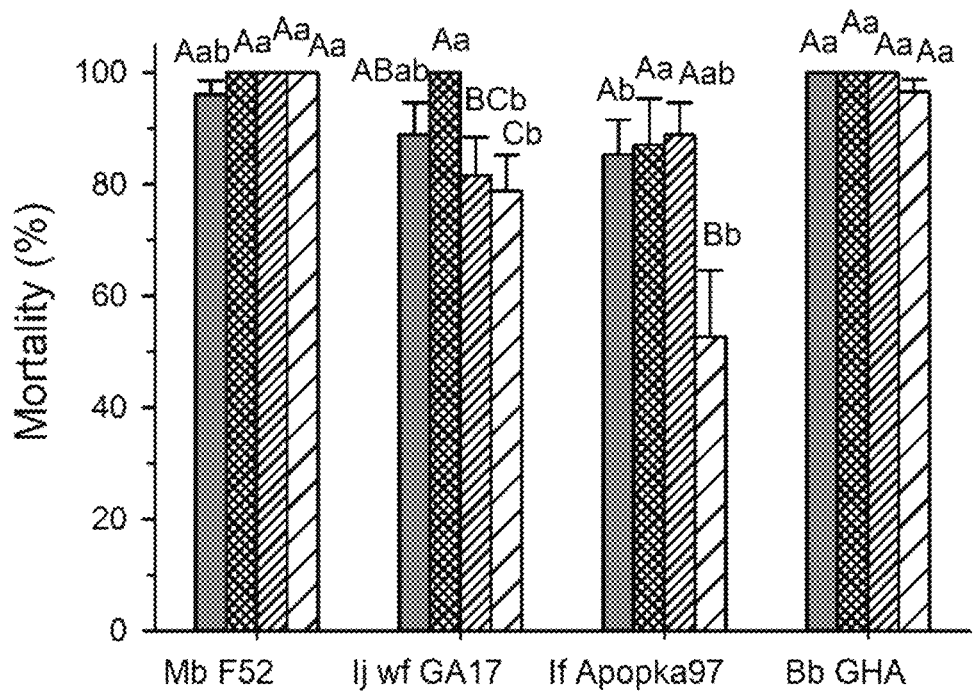
Figure 10C:
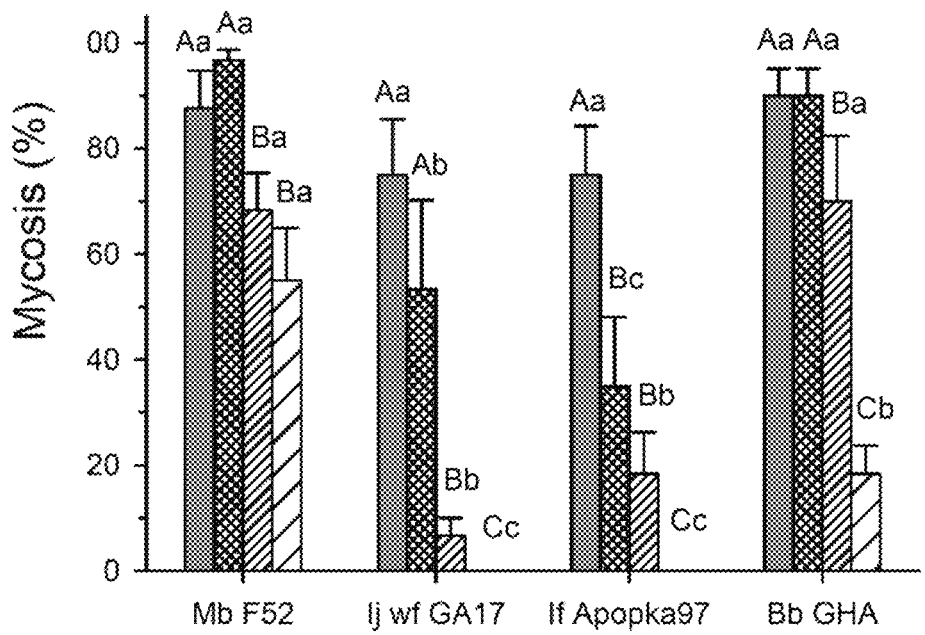
Figure 10D:
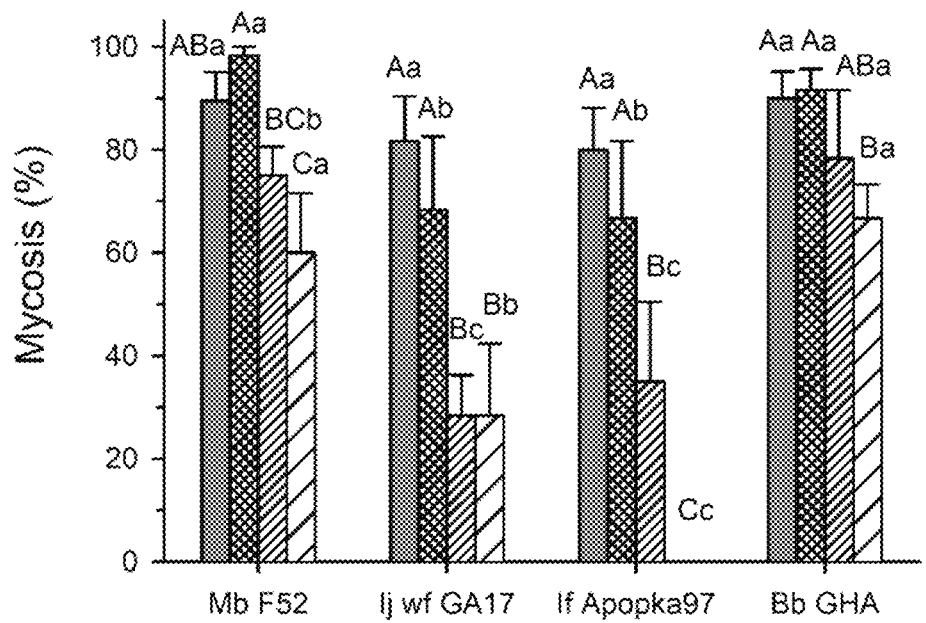

As seen on FIG. 10A to FIG. 10D, virulence after exposure to 40° C. was also affected by both time of heat exposure ($F_{3,79} \geq 6.52$, $P \leq 0.0005$) and fungal strain ($F_{3,79} \geq 10.62$, $P<0.0001$), with a significant interaction between the factors ($F_{9,79} \geq 2.28$, $P \leq 0.0252$) (FIG. 4A-D). The data for 7 dpi is shown in FIG. 10A, which illustrates the decline in mortality that started after 4 hours of 40° C. heat for Mb F52; after 2 hours of 40° C. heat for Ij wf GA17; after 1 hour of 40° C. heat for If Apopka 97; and after 4 hours of 40° C. heat for Bb GHA. As seen in FIG. 10C, reduced mycosis started after 2 hours of 40° C. heat for Mb F52; after 2 hours of 40° C. heat for Ij wf GA17; after 1 hour of 40° C. heat for If Apopka 97; and after 2 hours of 40° C. heat for Bb GHA. At 7 dpi, Ij wf GA17 showed higher mortality and mycosis than If Apopka 97 at 1 hour of heat treatment. These mortality and mycosis were lower than those for Mb F52 in all heat treatments, and lower than those for Bb GHA, except for mortality after 4 hour 40° C. heat treatment. As seen in FIG. 10B, at 14 dpi, mortality caused by Mb F52 and Bb GHA remained high after 4 hours of 40° C. heat, while Ij wf GA17 and If Apopka 97 had reduced mortality after 4 hours of 40° C. heat. As seen on FIG. 10C and FIG. 10D, decreased mycosis occurred after 4 hours of 40° C. heat for Mb F52; after 2 hours of 40° C. heat for Ij wf GA17 and If Apopka 97; and after 4 hours of 40° C. heat for Bb GHA. At 14 dpi, due to high mortality, Ij wf GA17 had similar response to If Apopka 97. But Ij wf GA17 had higher mycosis after 4 hours of treatment, in which If Apopka 97 had no fungal infection. In general, after heating at 40° C., fungi followed a similar pattern as when heated at 35° C. Ij wf GA17 presented with higher virulence than If Apopka 97, but lower than Mb F52 and Bb GHA, although the duration of tolerance was shorter at 40° C.

Figure 11A:
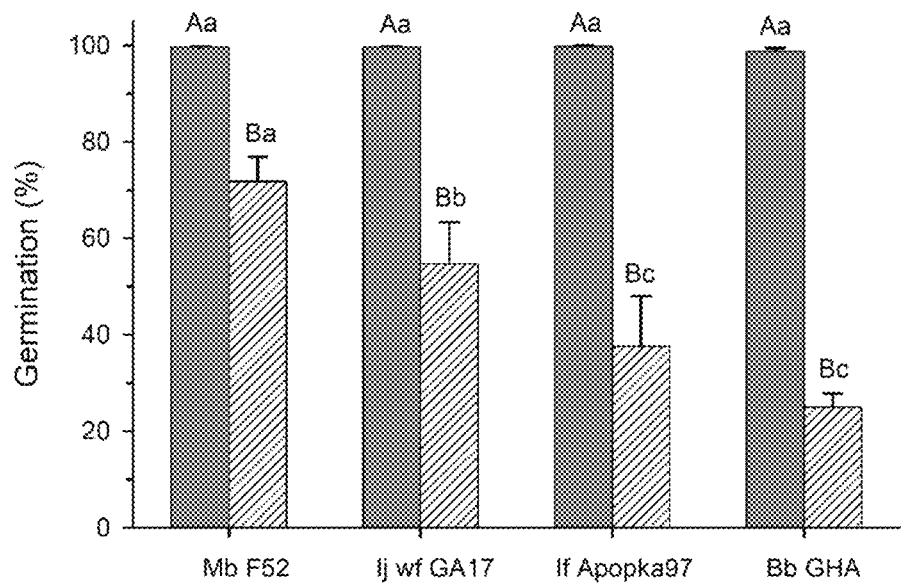
FIG. 11A to FIG. 11C depict graphs of the effect of low temperature on 16 hour germination, mortality, and mycosis of various fungi 7 days post inoculation.
Figure 11B:
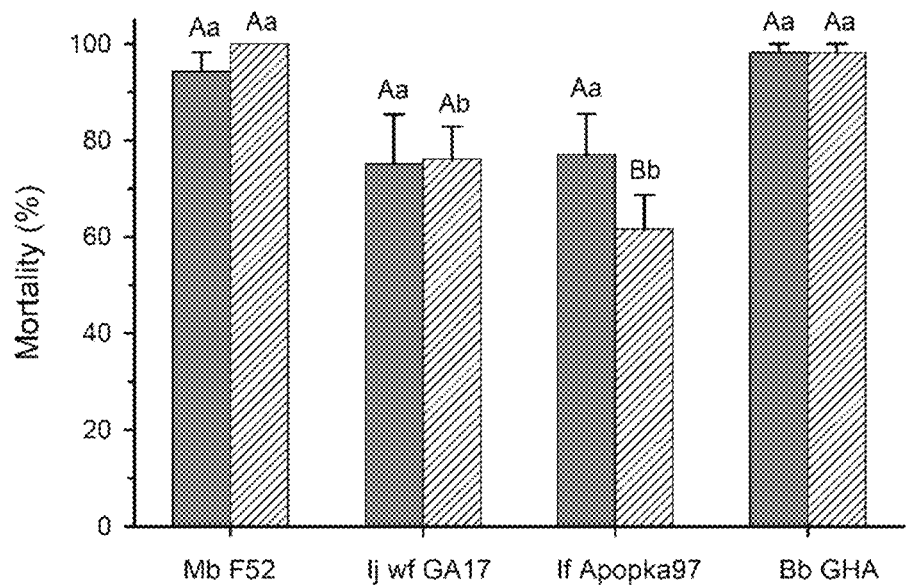
Figure 11C:
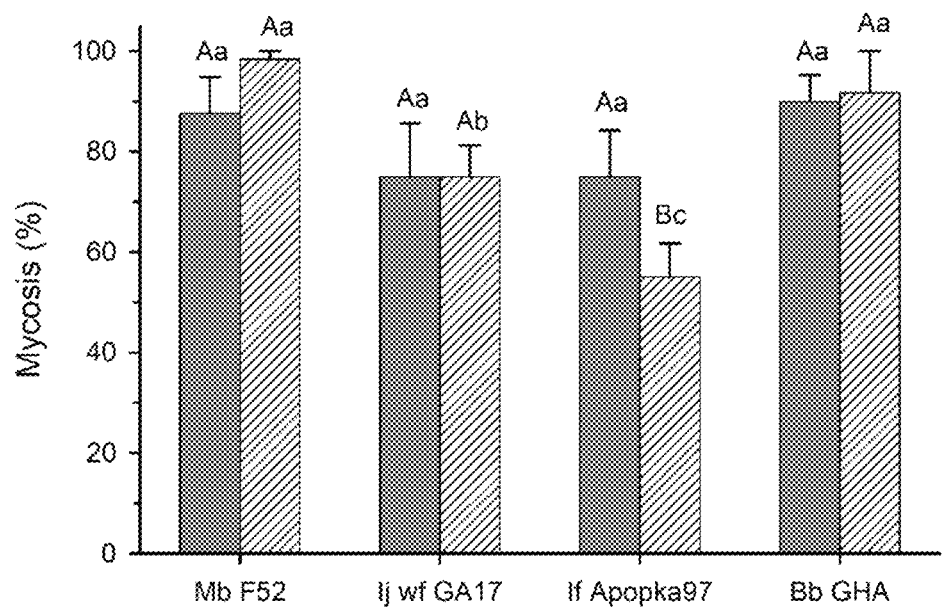

As seen on FIG. 11A to FIG. 11C, at −20° C., compared with 0 day (no cold treatment), the 56-day treatment had reduced germination of all fungi ($F_{1,39}$=161.47, P<0.0001), and the level of reduction varied with fungal strain ($F_{3,39}$=3.65, P=0.0206). As seen on FIG. 11A, after 56 days, Mb F52 had the highest germination, followed by Ij wf GA17; If Apopka 97 and Bb GHA being the lowest. As seen on FIG. 11B and FIG. 11C, the effects of cold treatment on fungal virulence as indicated by insect mortality and mycosis at 7 dpi varied among fungal strains ($F_{3,39}$≥6.25, P≤0.0014), ranging from no impact on Mb F52, Ij wf GA17, and Bb GHA, to significant suppression on If Apopka 97 ($F_{1,39}$≥24.85, P≤0.0336). At the 14 dpi observations, insect mortality was ≥85.1% and mycosis was ≥76.7% in all treatments; compared with 0 day, there was no treatment effect in reducing either mortality or mycosis (P>0.05). Although If Apopka 97 had lower mycosis (76.7±6.1%) than the other fungi (98.3±1.7% in Mb F52; 88.3±4.8% in Ij wf GA17; 91.7±8.3% in Bb GHA) for the 56-day exposure ($F_{3,39}$=4.00, P=0.0141), there was no difference between 0 and 56 day in any fungus ($F_{1,39}$=1.41, P=0.2422).

Example 7

Effect of UV Light on Viability and Virulence

Treatment with UV light significantly inhibited spore germination, insect mortality, and mycosis of all four fungi tested.

Spore suspensions of the four EPF were exposed to UV light to compare the UV tolerance of the Ij wf GA17 strain to the commercial strains. The experiment was carried out under a Labconco Purifier Class II Biosafety Cabinet (model 36209; Labconco, Kans. City, Mo., USA) equipped with a 254 nm UV lamp (Shapiro-Ilan D. I., et al., 2015, *"Viability and virulence of entomopathogenic nematodes exposed to ultraviolet radiation."* J. Nematol. 47: 184-189). A 1.5 ml spore suspension at the concentration of $10^6$ viable spores/ml was placed in the center of a 100-mm Petri dish and then exposed to UV light inside the cabinet for 5 or 10 minutes. Three replicates were used for each fungus. All dishes were randomly arranged under the UV lamp. After UV treatment, the fungal suspension was mixed by pipetting up and down with 1-ml tip for 10 times and a 0.1 ml aliquot was spread over PDA with 1% yeast extract in a 60 mm Petri dish and incubated at 25° C. for 16 hours and 40 hours to score the germination rate; two germination dishes were prepared for each replicate. The virulence of fungal spores after UV treatment was tested in Petri dishes as described previously for the temperature experiments. A complete set of fungal dishes that were not exposed to UV was also assessed in parallel to evaluate conidial germination and virulence. Insect mortality and mycosis were evaluated at 7 dpi and 14 dpi. The entire experiment was repeated twice.

Figure 12A:
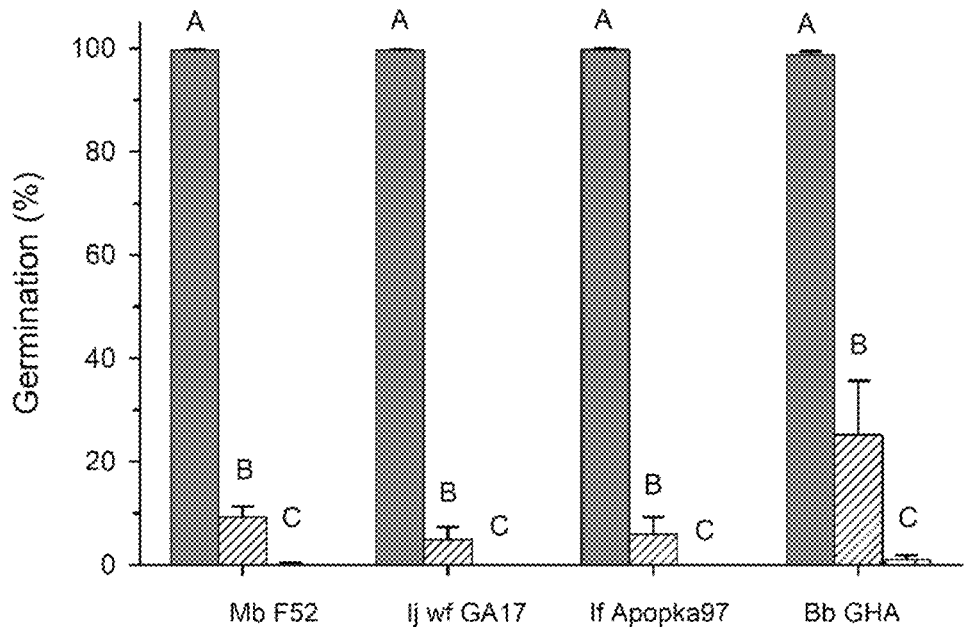
FIG. 12A to FIG. 12C depict graphs of the effect of UV exposure on 40 hour germination, mortality, and mycosis of various fungi at 14 days post-inoculation.

Before UV treatment, spore viability was at or above 99% for all fungi. After UV exposure and subsequent 16 hour incubation at 25° C., no germination occurred in most treatments, except for 0.7±0.2% germination of Bb GHA exposed to 5 minutes UV treatment. Treatment with UV light significantly inhibited spore germination of all fungi ($F_{2,59}$=496.79, P<0.0001). Bb GHA was marginally more tolerant than other fungi to 5-minute UV light exposure ($F_{3,59}$=2.97, P=0.039). Otherwise, there was no difference among fungi in their susceptibility to UV exposure. As seen on FIG. 12A, after UV exposure and subsequent 40-hour incubation, germination was significantly affected by UV exposure ($F_{2,59}$=126.75, P<0.0001), regardless of fungal strain (P>0.05). Both, 5 minute and 10 minute UV treatments, significantly inhibited spore germination of all fungi. The inhibition was more pronounced in the fungi exposed to 10 minutes UV treatment. When exposed to UV for 10 minutes followed by 40 hour germination at 25° C., Mb F52 showed only 0.2% germination; Bb GHA showed 1.0% germination, and Ij wf GA17 and If Apopka 97 showed no germination.

Figure 12B:
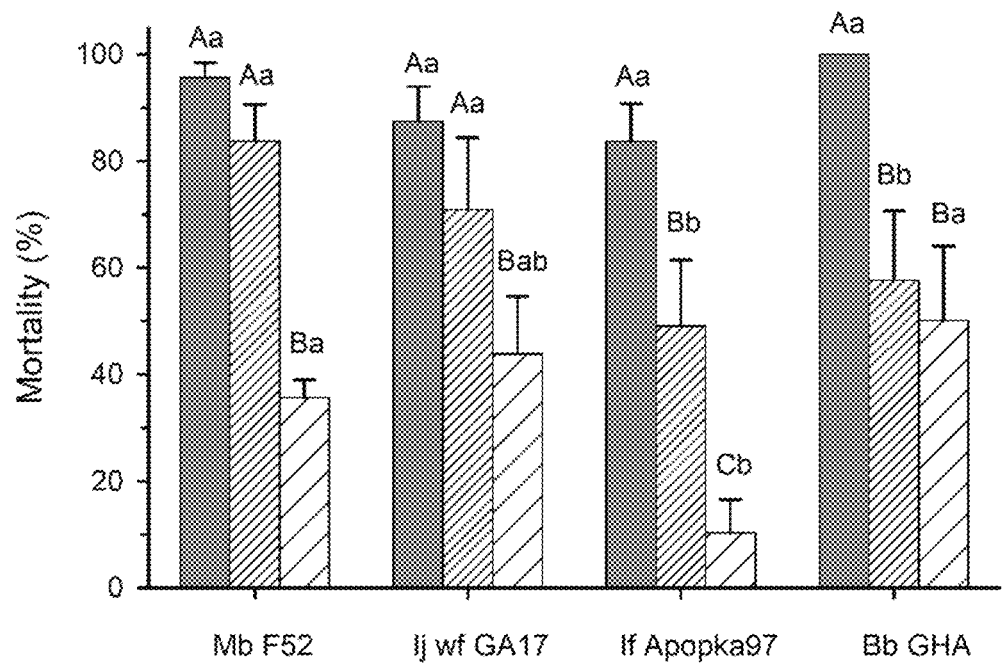
Figure 12C:
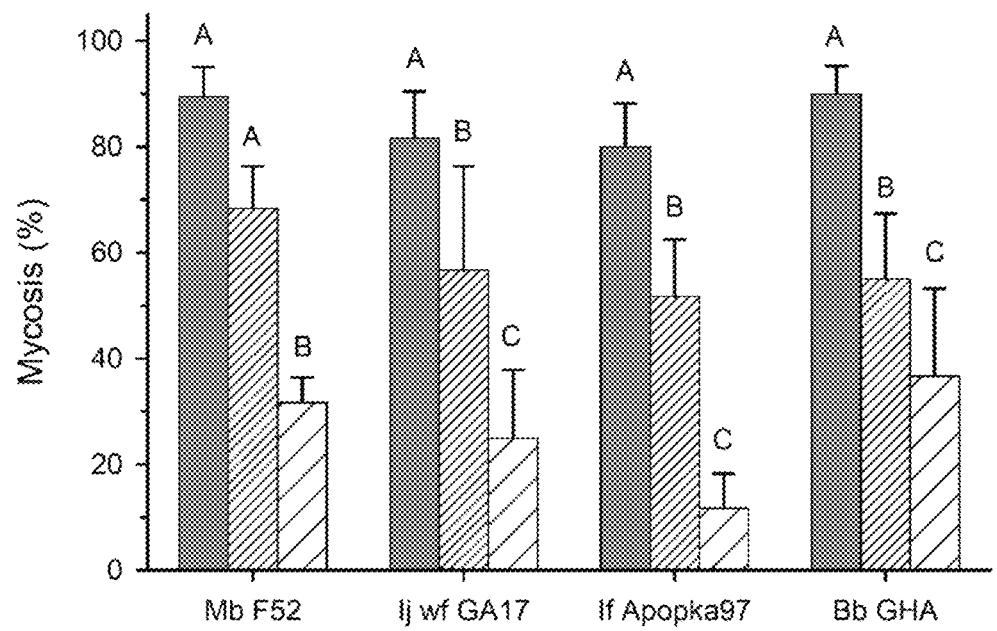

At 7 dpi, insect mortality and mycosis were very low (at or below 10%) and were significantly affected by 5-minute UV treatment and 10-minute UV treatment ($F_{2,59}$≥74.47, P<0.0001), regardless of fungal strain (P>0.05). As seen in FIG. 12B and FIG. 12C, at 14 dpi, insect mortality was affected by both time length of UV treatment ($F_{2,59}$=39.10, P<0.0001) and fungal strain ($F_{3,59}$=8.22, P=0.0001); mycosis was affected by UV treatment ($F_{2,59}$=39.84, P<0.0001) but not by fungal strain (P>0.05). There was an interaction between UV treatment and fungal-induced mortality ($F_{6,59}$=2.42, P=0.0372) but not in mycosis (P>0.05). Compared to observations before UV treatment, significant declines in mortality and mycosis appeared in all treatments except the exposure of Mb F52 and Ij wf GA17 to UV for 5 minutes, which showed reduced mycosis. Compared to 5-minute UV exposure, the exposure to UV for 10 minutes resulted in lower mortality and mycosis in all fungi, although no difference in mortality caused by Bb GHA was evident. As seen in FIG. 12B, after 5-minute UV exposure, If Apopka 97 and Bb GHA produced lower mortality than Mb F52 and Ij wf GA17. After 10-minute UV exposure If Apopka 97 showed lower mortality than Mb F52 and Bb GHA, but its mortality was not different from that of Ij wf GA17. However, as seen on FIG. 12C, all fungi had similar levels of mycosis at the same UV treatment.

The foregoing detailed description and certain representative embodiments and details of the invention have been presented for purposes of illustration and description of the invention. It is not intended to be exhaustive or to limit the invention to the precise forms disclosed. It will be apparent to practitioners skilled in the art that modifications and variations may be made therein without departing from the scope of the invention. All references cited herein are incorporated by reference in their entirety.

We claim:

1. A biocontrol composition comprising an agriculturally acceptable carrier and an effective amount of an entomopathogenic fungal strain named Ij wf GA17, having NRRL accession No. 67939 that kills agricultural, vegetable, or horticultural crop insect pests, wherein the composition is an emulsifiable concentrate or a granule suited for application as a spray with or without dilution into a liquid.

2. The biocontrol composition of claim 1, wherein the entomopathogenic fungal strain kills homopteran, curculionid pests, insect pests in the orders of Diptera, Coleoptera, Thysanoptera, Lepidoptera, Hemiptera, or mites.

3. The biocontrol composition of claim 1, wherein the composition is a liquid, a powder, a granule, a suspension concentrate, a flowable, a dry flowable, a dust, or a water dispersible granule.

4. The biocontrol composition of claim 1, wherein the agriculturally acceptable carrier is at least one polymer, oil, wax, emulsifier, surfactant, binder, clay, filler, water, agar, gelatin, a lipophilic substance, a plant seed, or a substance that assists application of the fungi, or adhesion of the fungi to a plant, or a plant part thereof.

5. The biocontrol composition of claim 1, wherein the emulsifiable concentrate or granule is diluted with water or oil.

6. The biocontrol composition of claim 4, wherein the plant seed is an agricultural crop seed, a vegetable seed, or a horticultural crop seed.

7. The biocontrol composition of claim 6, wherein the plant seed is a cole crop seed, a cucurbit seed, a cotton seed, a soybean seed, or a vegetable crop seed.

8. A kit comprising a first container comprising an entomopathogenic fungus named Ij wf GA17, having NRRL accession No. 67939 that kills agricultural, vegetable, or horticultural crop insect pests, and instructions for applying the entomopathogenic fungus to land, a plant, or part thereof, and optionally comprising a second container, wherein the entomopathogenic fungal strain is an emulsifiable concentrate or a granule suited for application as a spray with or without dilution into a liquid.

9. The kit of claim 8, wherein the first container comprises spores or vegetative mycelium of the entomopathogenic fungus.

10. The kit of claim 8, wherein the optional second container comprises an agriculturally acceptable carrier.

11. The kit of claim 10, wherein the agriculturally acceptable carrier is a polymer, a vegetable oil, a vegetable wax, a paraffinic oil, a paraffinic wax, an emulsion of oil and water, an aqueous solution containing a polymer, agar, gelatin, or a lipophilic substance that assists the fungi in adhering to a plant or part thereof.

12. A method for reducing the population of agricultural, vegetable, or horticultural crop insect pests in an area of land comprising applying to the land or to at least one part of a crop plant on the land an effective amount of the biocontrol composition of claim 1 to reduce the population of agricultural, vegetable, or horticultural crop insect pests.

13. The method of claim 12, wherein the applying step comprises broadcasting onto the land or to at least one part of a crop plant on the land, or planting crop seeds coated with spores of the fungal strain.

14. The method of claim 12, wherein the applying step comprises broadcasting onto the land or to at least one part of a crop plant on the land vegetative mycelium of the fungal strain, or planting crop seeds coated with vegetative mycelium of the fungal strain.

15. The method of claim 12, wherein the applying step comprises spraying the biocontrol composition onto crop plants, or at least a part of a crop plant present on the land.

16. The method of claim 15, wherein the part of the crop plants is a leaf, a seed, a fruit, a stem, a branch, a root, or a combination thereof.

17. A method of killing agricultural, vegetable, or horticultural crop insect pests in a crop field comprising applying the biocontrol composition of claim 1 in an amount effective to colonize crop plants in the crop field and kill the agricultural, vegetable, or horticultural crop insect pests.

18. The method of claim 17, wherein applying the biocontrol composition comprises broadcasting, or planting crop seeds coated with vegetative mycelium of the entomopathogenic fungal strain onto the crop field, or spraying onto the crop plants or parts thereof a liquid containing vegetative mycelium of the entomopathogenic fungal strain.

19. The method of claim 17, wherein applying the biocontrol composition comprises spraying onto at least one crop plant or at least one part thereof a liquid containing spores of the entomopathogenic fungal strain.

* * * * *